US010555252B2

(12) United States Patent
Liu et al.

(10) Patent No.: US 10,555,252 B2
(45) Date of Patent: Feb. 4, 2020

(54) SYSTEM AND METHOD FOR CONFIGURATION AND SELECTION OF AN EVOLVED PACKET DATA GATEWAY

(71) Applicant: Provenance Asset Group LLC, Essex, CT (US)

(72) Inventors: Jennifer Liu, Murray Hill, NJ (US); Alessio Casati, Murray Hill, NJ (US); Bruno Landais, Murray Hill, NJ (US)

(73) Assignee: PROVENANCE ASSET GROUP LLC, Essex, CT (US)

( * ) Notice: Subject to any disclaimer, the term of this patent is extended or adjusted under 35 U.S.C. 154(b) by 0 days.

(21) Appl. No.: 15/563,962

(22) PCT Filed: Apr. 2, 2016

(86) PCT No.: PCT/US2016/025791
§ 371 (c)(1),
(2) Date: Oct. 3, 2017

(87) PCT Pub. No.: WO2016/161404
PCT Pub. Date: Oct. 6, 2016

(65) Prior Publication Data
US 2018/0139692 A1 May 17, 2018

Related U.S. Application Data

(60) Provisional application No. 62/142,668, filed on Apr. 3, 2015, provisional application No. 62/249,631, filed on Nov. 2, 2015.

(51) Int. Cl.
*H04W 48/18* (2009.01)
*H04W 88/06* (2009.01)

(52) U.S. Cl.
CPC ............ *H04W 48/18* (2013.01); *H04W 88/06* (2013.01)

(58) Field of Classification Search
CPC ..................................................... H04W 48/18
See application file for complete search history.

(56) References Cited

U.S. PATENT DOCUMENTS

| 2011/0261787 | A1* | 10/2011 | Bachmann | ............ | H04L 63/029 370/331 |
| 2012/0093031 | A1* | 4/2012 | Wang | ...................... | H04L 29/06 370/254 |

(Continued)

FOREIGN PATENT DOCUMENTS

WO 2011/097172 A1 8/2011

OTHER PUBLICATIONS

Article 94(3) EPC Examination Report received for corresponding European Patent Application No. 16717044.8, dated Nov. 27, 2018, 7 pages.

(Continued)

*Primary Examiner* — Angel T Brockman
(74) *Attorney, Agent, or Firm* — Dinsmore & Shohl LLP

(57) ABSTRACT

User equipment receives and stores configuration information for selection of an evolved packet data gateway (ePDG). The ePDG configuration information includes one or more parameters relating to identification and functions of ePDGs in an HPLMN and/or in one or more VPLMNs. When the UE performs ePDG selection, the UE accesses the ePDG configuration information and then selects an ePDG for access to a core packet network using the ePDG configuration information.

20 Claims, 18 Drawing Sheets

(56) References Cited

U.S. PATENT DOCUMENTS

| | | | | |
|---|---|---|---|---|
| 2012/0106431 A1* | 5/2012 | Wu | ........................ | H04W 4/00 |
| | | | | 370/312 |
| 2012/0322412 A1 | 12/2012 | Qiang | | |
| 2014/0153559 A1 | 6/2014 | Roeland | | |
| 2015/0223121 A1* | 8/2015 | Keller | ............... | H04W 36/0022 |
| | | | | 370/331 |
| 2016/0226922 A1* | 8/2016 | Russell | ............... | H04L 65/1016 |

OTHER PUBLICATIONS

International Preliminary Report on Patentability received for corresponding Patent Cooperation Treaty Application No. PCT/US2016/025791, dated Oct. 3, 2017, 7 pages.

International Search Report and Written Opinion received for corresponding Patent Cooperation Treaty Application No. PCT/US2016/025791, dated Oct. 6, 2016, 10 pages.

"Universal Mobile Telecommunications System (UMTS); LTE; Architecture enhancements for non-3GPP accesses (3GPP TS 23.402 version 12.8.0 Release 12)", Technical Specification, European Telecommunications Standards Institute (ETSI), vol. 3GPP SA 2, No. v12.8.0, Sophia-Antipolis, France, dated Apr. 1, 2015, 293pages.

* cited by examiner

SYSTEM AND METHOD FOR CONFIGURATION AND SELECTION OF AN EVOLVED PACKET DATA GATEWAY

TECHNICAL FIELD

This application relates generally to access networks, and more specifically to selection of a core data packet gateway for connection to a packet core network through the access networks.

DESCRIPTION OF RELATED ART

The statements in this section provide a description of related art and are not admissions of prior art. User equipment (UE), such as smart phones, smart tablets, laptops, computers, etc., often include capability for both wireless local area network (WLAN) connectivity (such as IEEE 802.11x compliant WLAN connectivity) and radio access network connectivity (such as technologies wholly or partially compliant with the 3rd generation partnership project (3GPP) set of standards including EVDO, UMTS, HSPA, and LTE). Such UE is typically associated with a first network carrier that has a geographically confined network or Home Public Land Mobile Network (HPLMN), but the UE may also roam in other territories or Visiting Public Land Mobile Networks (VPLMN).

The UE may connect to the 3GPP evolved packet core (EPC) network using two types of access technologies. These access technologies are composed of 3GPP access networks and non-3GPP access networks. 3GPP access networks are wholly or partially compliant with technologies specified by the 3GPP set of standards and include, e.g. GPRS. UMTS, EDGE. HSPA. LTE and LTE Advanced. Non-3GPP access networks are wholly or partially compliant with technologies that are not specified by the 3GPP set of standards. They include technologies such as cdma2000. WLAN or fixed networks.

The 3GPP set of standards specifies two classes of non-3GPP access technologies with different security mechanisms: trusted access networks and untrusted access networks. Trusted access networks include access networks that the network operator considers trustable from a security stand point (for example: a cdma2000 network). Trusted non-3GPP accesses interface directly with the EPC network. Untrusted access networks include access networks that may pose a higher security risk (for example, a public WiFi hotspot. LTE metro network, or femtocell access network). Untrusted non-3GPP access networks are connected to the EPC network via an Evolved Packet Data Gateway (ePDG), which provides additional security mechanisms.

The Evolved Packet Data Gateway (ePDG) is a network element that provides for interworking between the EPC network and untrusted non-3GPP access networks and helps provide a more secure access to the EPC network. The ePDG may be configured to include one or more network core functions. e.g., IPSec Tunnel authentication, authorization and establishment, termination of IKEv2 signaling and relay via AAA messages, routing of packets to and from a Serving Gateway (S-GW) and PDN Gateway (P-GW) in the EPC network, and enforcement of Quality of Service (QoS) policies.

In one known process, when roaming in a VPLMN, a UE selects an ePDG based on the vising Public Land Mobility Network (VPLMN) ID. For example, a UE receives a list of roaming networks that are available, and selects one of the networks, either in an automated fashion or through manual user selection. Based on the received VPLMN ID, a UE generates a fully qualified domain name (FQDN), and queries a domain name system (DNS) on the generated FQDN to select a visiting ePDG (v-ePDG) ID. The UE establishes an IPSec tunnel with the HPLMN through the v-ePDG. Typically, the creation of the FQDN is governed by rules set out in the 3GPP set of standards, such as 3GPP TS 23.003. Currently, only as a last resort, when the VPLMN ID is unknown, the UE may construct a FQDN query to a DNS based on its home PLMN ID.

However, several problems have arisen with this process of selecting an ePDG. For example, some types of UE may not receive a roaming network list (e.g. when roaming to a region that does not support the RAN access type of the UE or when roaming is over a non-3GPP access network). In addition, the VPLMN may not have the same set of services offered as the HPLMN, e.g., the VPLMN may not support voice over WiFi (VoWiFi) services or a roaming agreement with the VPLMN may not exist or sufficient interoperability testing has not performed to ensure service capability. In addition, the varying capabilities of ePDGs are not considered during this selection process.

Therefore, a need exists to provide an improved system and method for selection of an ePDG by UE for access to an EPC network.

SUMMARY

In an embodiment, a method of selecting an evolved packet data gateway (EPDG) by a user equipment (UE) includes accessing ePDG configuration information for one or more PLMNs, wherein the ePDG information includes identification of one or more ePDGs in the one or more Public Land Mobile Networks (PLMNs); selecting an ePDG using the ePDG configuration information; and connecting to the ePDG for access to a core network.

In another embodiment, a method of selecting an evolved packet data gateway (EPDG) by a user equipment (UE) includes receiving a request for an emergency services session; accessing ePDG configuration information for one or more PLMNs, wherein the ePDG information includes identification of one or more ePDGs that support emergency services; selecting an ePDG using the ePDG configuration information; and connecting to the selected ePDG to establish the emergency services session.

In still another embodiment, User equipment (UE) includes a wireless local area network (WLAN) transceiver for connecting to a non-trusted 3GPP access network; a memory device for storing ePDG configuration information, wherein the ePDG information includes identification of one or more ePDGs in the one or more Public Land Mobile Networks (PLMNs); and a processing device. The processing device is configured to select an ePDG using the ePDG configuration information and establish a connection to the selected ePDG.

In some embodiments of any of the above apparatus/methods, the UE attaches to a non-3GPP compliant access network in a visited PLMN (VPLMN); and the processing device selects an ePDG in the VPLMN using the ePDG configuration information.

In some embodiments of any of the above apparatus/methods, the UE attaches to a non-3GPP compliant access network in a visited PLMN (VPLMN); and the processing device selects an ePDG in the HPLMN of the UE using the ePDG configuration information.

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof.

Some of the abbreviations used herein are expanded below for convenience:
ANDSF Access Network Discovery and Selection Function
DDF Distributed Data Framework
HPLMN Home PLMN or Equivalent Home PLMN
ePDG Evolved Packet Data Gateway
FQDN Fully Qualified Domain Name
H-ANDSF ANDSF in HPLMN
PLMN Public Land Mobile Network
UE User Equipment
V-ANDSF ANDSF in VPLMN
VoWiFi Voice Over WiFi (e.g., IEEE 802.11x defined WLAN networks)
VPLMN Visited PLMN One or more embodiments are described herein that provide a system and method for configuration and selection of an ePDG. UE receives and stores configuration information for selection of an evolved packet data gateway (ePDG). The ePDG configuration information includes one or more parameters relating to identification or functions of ePDGs in an HPLMN and/or in one or more VPLMNs. When the UE performs ePDG selection, the UE accesses the ePDG configuration information and then selects an ePDG for access to a core packet network using the ePDG configuration information.

Figure 1:
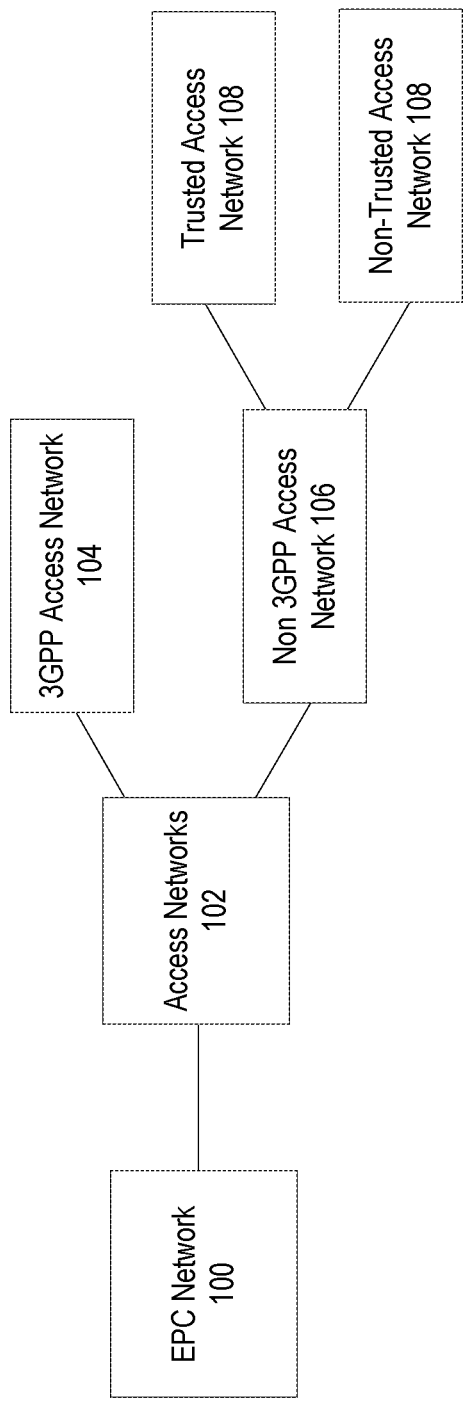
FIG. 1 illustrates a schematic block diagram of an embodiment of types of access networks for an evolved packet core.

FIG. 1 illustrates a schematic block diagram of an embodiment of types of access networks for an evolved packet core. An evolved packet core (EPC) network 100 includes a packet core network fully or partially compliant with current or revised 3GPP set of standards or other type of internet protocol (IP) data packet core network. The EPC network 100 is communicatively coupled to one or more access networks 102. In an embodiment, the access networks 102 include one or more 3GPP access networks 104 and one or more non-3GPP access networks 106. 3GPP access networks 104 are wholly or partially compliant with technologies specified by the 3GPP set of standards and include, e.g. GPRS, UMTS, EDGE, HSPA, LTE and LTE Advanced. The non-3GPP access networks 106 are wholly or partially compliant with technologies that are not specified by the 3GPP set of standards. The non-3GPP access networks 106 may include one or more trusted access networks 108 or one or more non-trusted access networks 110.

In an embodiment, one or more ePDG configuration parameters are implemented as part of an Access Network Discovery and Selection Function (ANDSF) managed object to allow the UE's home operator to configure selection of the evolved packet gateway (ePDG). For example, the ePDG configuration information is included with Home Network Preference information from a Home ANDSF (H-ANDSF) in its HPLM or equivalent HPLM (EPLMN). The Home Network Preference information may include, e.g., access network discovery information. WLAN selection information, inter-system mobility policy, inter-system routing policies and inter-APN routing policies (IARP). Home Network Preference information thus assists the UE in selecting a WLAN, a service provider for 3GPP-based authentication over WLAN, and also now in selecting an ePDG. The UE may retain and use this information until new or updated information is received from the ANDSF.

Figure 2:
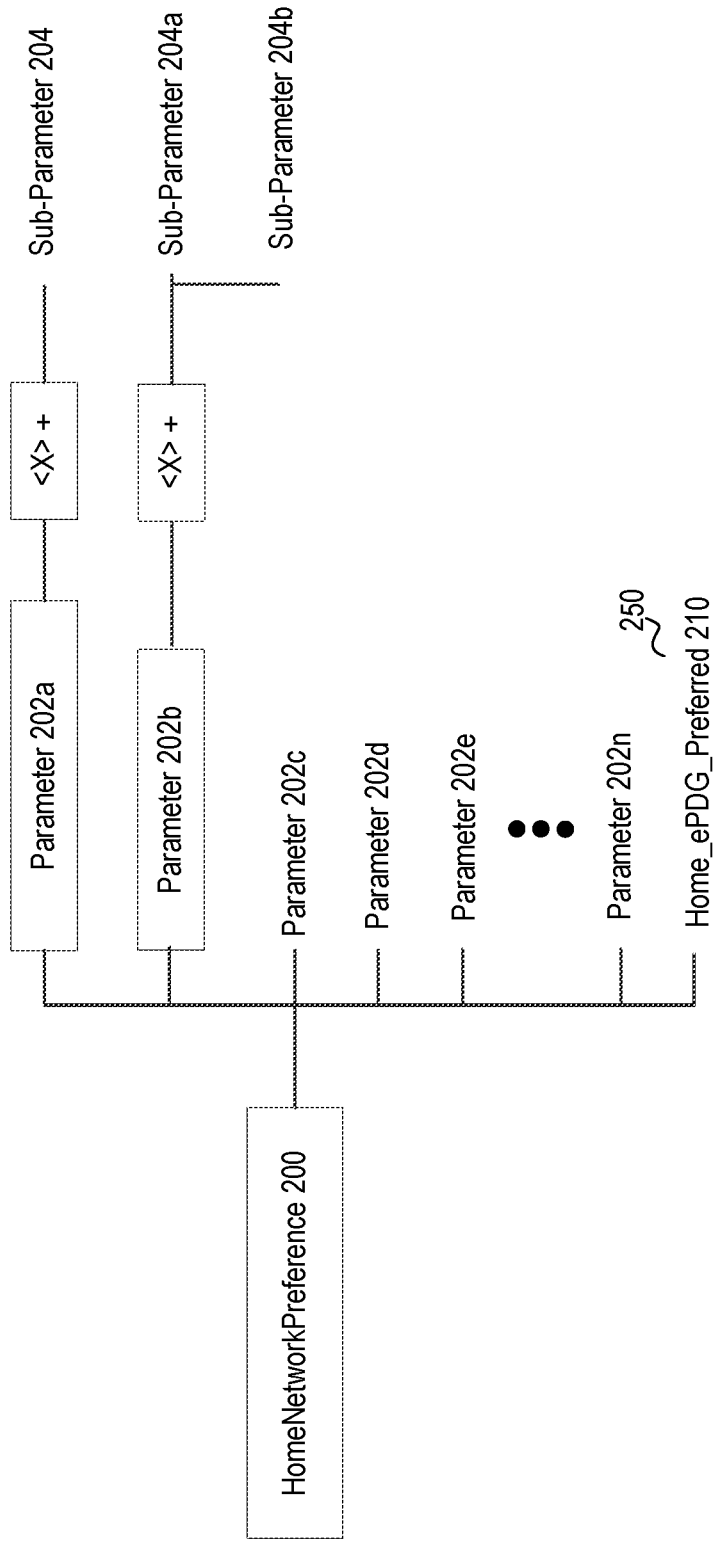
FIG. 2 illustrates a schematic block diagram of an embodiment of home network preference information.

FIG. 2 illustrates a schematic block diagram of an embodiment of Home Network Preference information 200. The Home Network Preference information is stored in the UE and includes a plurality of parameters 202a-n as part of Access Network Discovery and Selection Function (ANDSF) managed object. For example, the plurality of parameters 202a-n may relate to, e.g., access network discovery information, WLAN selection information, inter-system mobility policy, inter-system routing policies and inter-APN routing policies (IARP). One or more of the plurality of parameters may include additional information or specifications shown as sub-parameters 204 and 206a-b. The UE may initiate or request provisioning of Home Network Preference information from the H-ANDSF, e.g., using a client-initiated session containing a generic alert. Additionally, the H-ANDSF may push or transmit the Home Network Preference information to the UE. In an embodiment, the UE may ignore any Home Network Preference information provided by a V-ANDSF.

In an embodiment, one of the plurality of parameters 202a-n includes ePDG configuration information 250. In this embodiment, the ePDG configuration information includes a home evolved packet data gateway preferred (home_ePDG_preferred) configuration parameter 210. Though the home ePDG preferred configuration parameter 210 is shown as included as a parameter under the Home Network Preference information 200, it may alternatively be implemented as a sub-parameter 204, 206 under another one of the plurality of parameters 202a-n or as part of other managed objects provided as part of the ANDSF. The home_ePDG_preferred configuration parameter 210 indicates a preferred ePDG for selection by the UE. For example, when it is preferred that a roaming UE connect to a home ePDG (h-ePDG) in the HPLMN, it configures the home ePDG preferred configuration parameter 210 stored in the UE to indicate that a h-ePDG is preferred.

For example, the home ePDG preferred configuration parameter 210 indicates a first value when the home operator does not have an ePDG connection preference for the UE and indicates a second value when the home operator prefers the UE to connect with a h-ePDG of the HPLMN (or an equivalent HPLMN). A default value may be the first value or the second value when the home ePDG preferred configuration parameter 210 is not provisioned or is not included.

Figure 3:
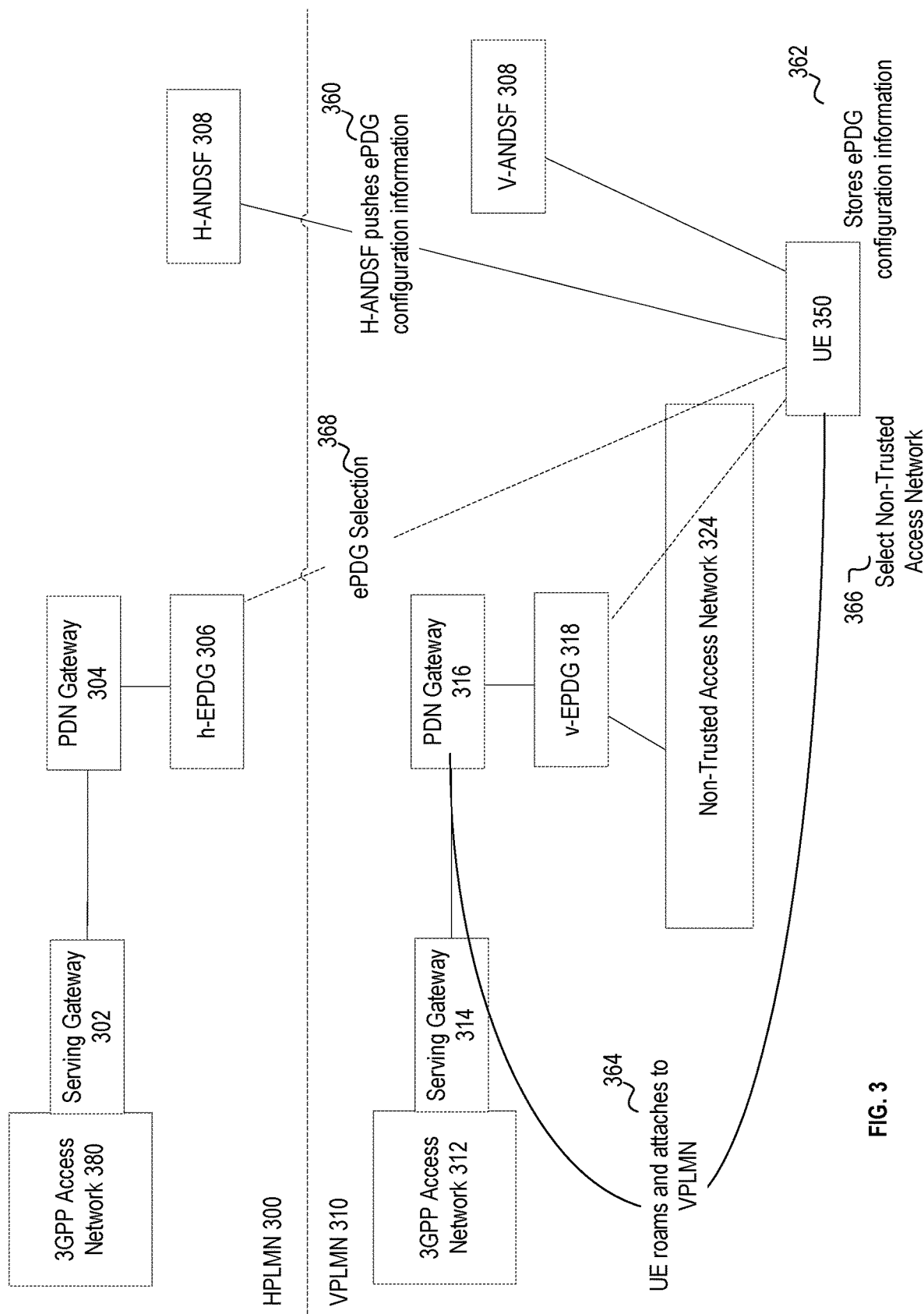
FIG. 3 illustrates a schematic block diagram of an embodiment of a selection procedure for an ePDG in an EPC network.

FIG. 3 illustrates a schematic block diagram of an embodiment of a selection procedure for an ePDG in an EPC network using ePDG configuration information. A home PLMN (HPLMN) 300 includes a 3GPP access network 380 communicatively coupled to a serving gateway (S-GW) 302. The serving gateway 302 is coupled to a PDN gateway 304. The PDN gateway 304 is communicatively coupled to a home ePDG (h-ePDG) 306. The h-ePDG 306 provides an interface between the HPLMN 300 and non-trusted access networks. The HPLMN 300 further includes a home ANDSF (H-ANDSF) 308. Though shown as separate devices, the h-ePDG 306 can be combined with the serving gateway 302 and/or the PDN gateway 304 in a single device.

A VPLMN 310 includes another 3GPP access network 312 communicatively coupled to a VPLMN serving gateway (S-GW) 314. The VPLMN serving gateway 314 is coupled to a VPLMN PDN gateway 316. The VPLMN PDN gateway 316 is communicatively coupled, e.g. using an S2b layer protocol, to a visiting ePDG (v-ePDG) 318. Though shown as separate devices, the v-ePDG 318 can be combined with the serving gateway 314 and/or the PDN gateway 316 in a single device. The VPLMN 310 further includes a vising ANDSF (V-ANDSF) 320.

In 360 shown in FIG. 3, the H-ANDSF 308 may push or transmit the Home Network Preference information to the UE 350, wherein the Home Network Preference information includes ePDG configuration information 250, such as the home ePDG preferred configuration parameter 210. The UE 350 stores the ePDG configuration information 250, including the home ePDG preferred configuration parameter 210, as shown in 362.

In an embodiment, as shown in step 364, the UE 350 roams and connects or attempts to connect or attach to the VPLMN 310. In an embodiment, shown in step 366, the UE 350 selects a non-trusted access network 324 for connection to the VPLMN 310. The non-trusted access network 324 may be compliant with a technology or standard that does not provide an adequate level of security for direct connection to a serving gateway in the EPC network, e.g. the technology is not specified by the 3GPP set of standards as a secure technology. The insecure technology may include. e.g., cdma2000, WLAN or fixed network type technologies.

When attempting to access or attach to the VPLMN 310 or HPLMN 300 through a non-trusted non-3GPP access network, the UE 350 performs ePDG selection, as shown at 368. The selected ePDG (in this example h-ePDG 306) helps to establish and manage IP tunnels, such as IP Security/Internet Key Exchange Version 2 IPsec/IKEv2 tunnels with the UE 350. The IPsec tunnels are used to perform secure transfers of authentication information and subscriber data over the untrusted interfaces and backhauls of the non-trusted access network 324. In addition, the ePDG may perform one or more of: authentication and authorization of the subscriber equipment and data; implement the S2b interface (currently based on Proxy Mobile IP v6 [PMIPv6], with GPRS Tunneling Protocol [GTP]) toward the PDN gateway (P-GW) to anchor the user session with the UE 350; or convey assigned IP addresses (IPv4, IPV6, or IPv4v6) to the UE 350.

The UE 350 first performs VPLMN selection and then performs ePDG selection. For ePDG selection, the UE 350 accesses the Home Preference Information 200 and determines whether the home_ePDG_preferred configuration parameter 210 is included in the Home Preference Information 200.

When the home_ePDG_preferred configuration parameter 210 is included in the Home Preference Information, and the home_ePDG_preferred configuration parameter 210 indicates a selection preference for a h-ePDG provided by the HPLMN or an equivalent HPLMN (EHPLMN), the UE 350 selects a h-ePDG in the HPLMN. For example, the UE 350 includes a PLMN identity of the HPLMN (HPLMN ID) or EHPLMN (EPLMN ID) in an ePDG FQDN to a DNS server. The domain name server (DNS) is a server or other network element operable for mapping between IP addresses and FQDNs. The DNS server returns an IP address corresponding to a h-ePDG. The UE initiates a request for an IPSec tunnel with the selected h-ePDG. The selected h-ePDG helps to authenticate and establish the IPSec tunnel between the UE 350 and itself. The h-ePDG performs various network functions, e.g., IPSec Tunnel authentication, authorization and establishment, as well as termination of IKEv2 signaling and relay via AAA messages, routing of packets to and from the Serving Gateway (S-GW) 302 and PDN Gateway (P-GW) 304 in the HPLMN 300, and enforcement of Quality of Service (QoS) policies.

When the home_ePDG_preferred configuration parameter 210 is not included in the Home Preference Information 200 or the home_ePDG_preferred configuration parameter 210 does not indicate a preference for an h-ePDG 306, the UE 350 selects an ePDG based on other information, such as whether the UE 350 is provided with a list of available VPLMN ID(s). For example, when VPLMN IDs are available, the UE 350 may select a v-ePDG using one of the VPLMN IDs in a ePDG FQDN query. When VPLMN IDs are not available, the UE 350 may select an h-ePDG as a last resort using its HPLMN ID.

In general, one or more embodiments include a system and method for configuration and selection of an ePDG by a UE 350 based ePDG configuration information 250. In an embodiment, the UE stores one or more configuration parameters relating to selection of an ePDG as ePDG configuration information 250. When the UE performs ePDG selection, the UE accesses the ePDG configuration information 250 and determines any preferences in the configured information relating to ePDG selection. The UE then selects the ePDG based on the ePDG configuration information 250.

Figure 4:
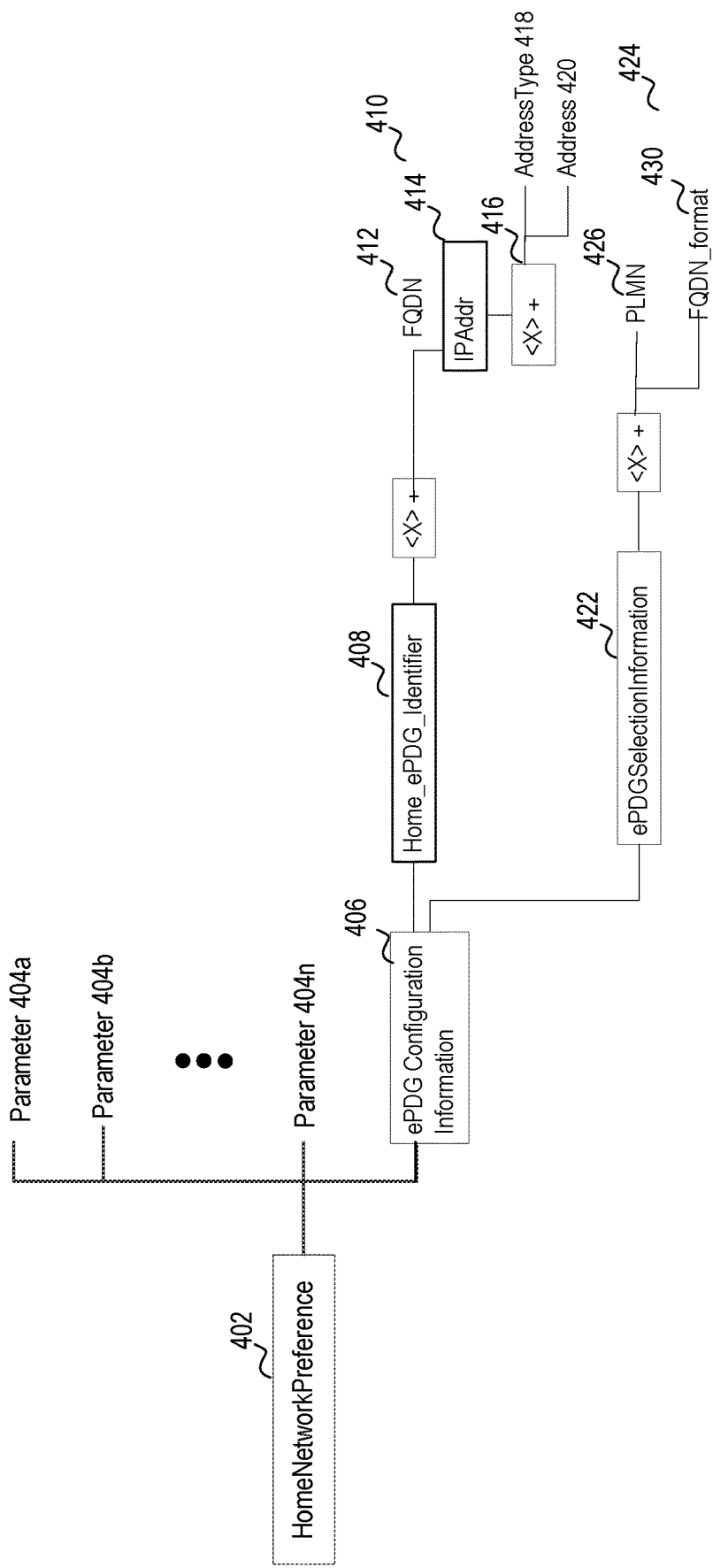
FIG. 4 illustrates a schematic block diagram of another embodiment of home network preference information.

FIG. 4 illustrates a schematic block diagram of another embodiment of Home Network Preference information 400. In this embodiment, the configuration information provides more flexibility in selecting the ePDG. For example, in some instances, it may be preferred for a UE 350 to connect to a v-ePDG in one or more predetermined VPLMNs. In this embodiment, the UE 350 may be configured with a list of one or more predetermined VPLMN IDs. When roaming in these predetermined VPLMNs, the UE 350 then selects a v-ePDG in these predetermined VPLMNs.

In addition, it may be desirable to define the interaction between a VPLMN's ePDG selection policies and a HPLMN's ePDG selection policies. For example, the UE 350 may be configured on how to select an ePDG when ePDG selection policies of both the VPLMN 310 and HPLMN 300 are available, when only one ePDG selection policy is available or when no ePDG selection policy is available. For example, an ePDG from an HPLMN 300 may be given preference in the ePDG selection procedure unless a VPLMN policy indicates to the UE that the ePDG of the HPLMN 300 should not be selected. In addition, a HPLMN 300 may want to configure selection of h-ePDGs in an HPLMN 300. e.g. based on geographical region of the h-ePDG and/or UE 350.

In an embodiment, the ePDG configuration information 406 includes one or more parameters, such as a home ePDG identifier parameter 408 or an ePDG selection information parameter 422 or both. The home ePDG identifier parameter 408 provides an indication whether identification information 410 for one or more h-ePDGs for the UE's HPLMN 300 is present. When present, the home ePDG identifier parameter 408 provides identification information 410 for one or more h-ePDGs in the UE's HPLMN 300. For example, the identification information 410 of an h-ePDG may include the Fully Qualified Domain Name (FQDN) 412 and/or IP address configuration information 414 of an h-ePDG. The IPAddr parameter 414 acts as a placeholder for a list of IP addresses associated with the h-ePDG, e.g. it indicates that one or more IP addresses are listed for the h-ePDQ. For each IP address listed for an h-ePDQ, an IP address type 418 (such as the IP version value, "IPv4", "IPv6", etc.) and/or an IP address 420 (Values: <an IPv4 address>, <an IPv6 address>) may be provided.

The ePDG Selection Information parameter 422 indicates PLMN information 424 for one or more PLMN parameters 426. The PLMN parameter 426 may identify a single PLMN, e.g. include a specific PLMN ID, or may identify a set of PLMNs, e.g. include a value of "Any PLMN". For each identified PLMN parameter 426, the PLMN information 424 includes a FQDN format 430 parameter.

The FQDN_format parameter 430 indicates whether an operator identifier FQDN format or location based FQDN format should be constructed by the UE 350 to connect to the ePDG of the associated PLMN. The FQDN_format value is used by the UE 350 when constructing a FQDN as follows. When a location based FQDN format is indicated, the UE 350 constructs a Tracking/Location Area identity FQDN using the PLMN ID of the PLMN that the UE 350 is attached to and TAC/LAC of the area that the UE 350 is located in. Otherwise, the UE 350 constructs an Operator Identifier FQDN using the PLMN ID of the PLMN to which the UE 350 is currently attached.

The UE 350 performs ePDG selection based on the ePDG configuration information 406. The ePDG configuration information 406 may be configured in the UE 350 either via a H-ANDSF 308 of its HPLMN 300. V-ANDSF 320 of the VPLMN 310 or via a Universal Subscriber Identity Module (USIM) application on an a smart card such as a Universal Integrated Circuit Card (UICC) of the UE 350 or via other implementation specific means. When configured via the H-ANDSF 308, the ePDG configuration information 406 may be provisioned under Home Network Preference 402. When configured via Universal Subscriber Identity Module (USIM) application on the UICC, the ePDG configuration information 406 is provisioned in one or more files (such as EFePDGId and EFePDGSelection files) stored on the UICC. The UICC is the physical card with basic logical functionality (based on 3GPP TS 31.101) and the USIM is an application stored on the UICC. The USIM application operating on the UICC helps provide authentication and secure access to an EPC network 100 even for non-3GPP access networks 106. In addition, implementation specific means may be used to configure the ePDG configuration information 406 when configurations via the H-ANDSF, V-ANDSF and the USIM are not available.

When the UE 350 attempts to access the EPC network 100 using an ePDG, e.g. from an untrusted or unsecure or non-3GPP access network 110, the UE 350 selects the ePDG using the ePDG configuration information 406.

Figure 5:
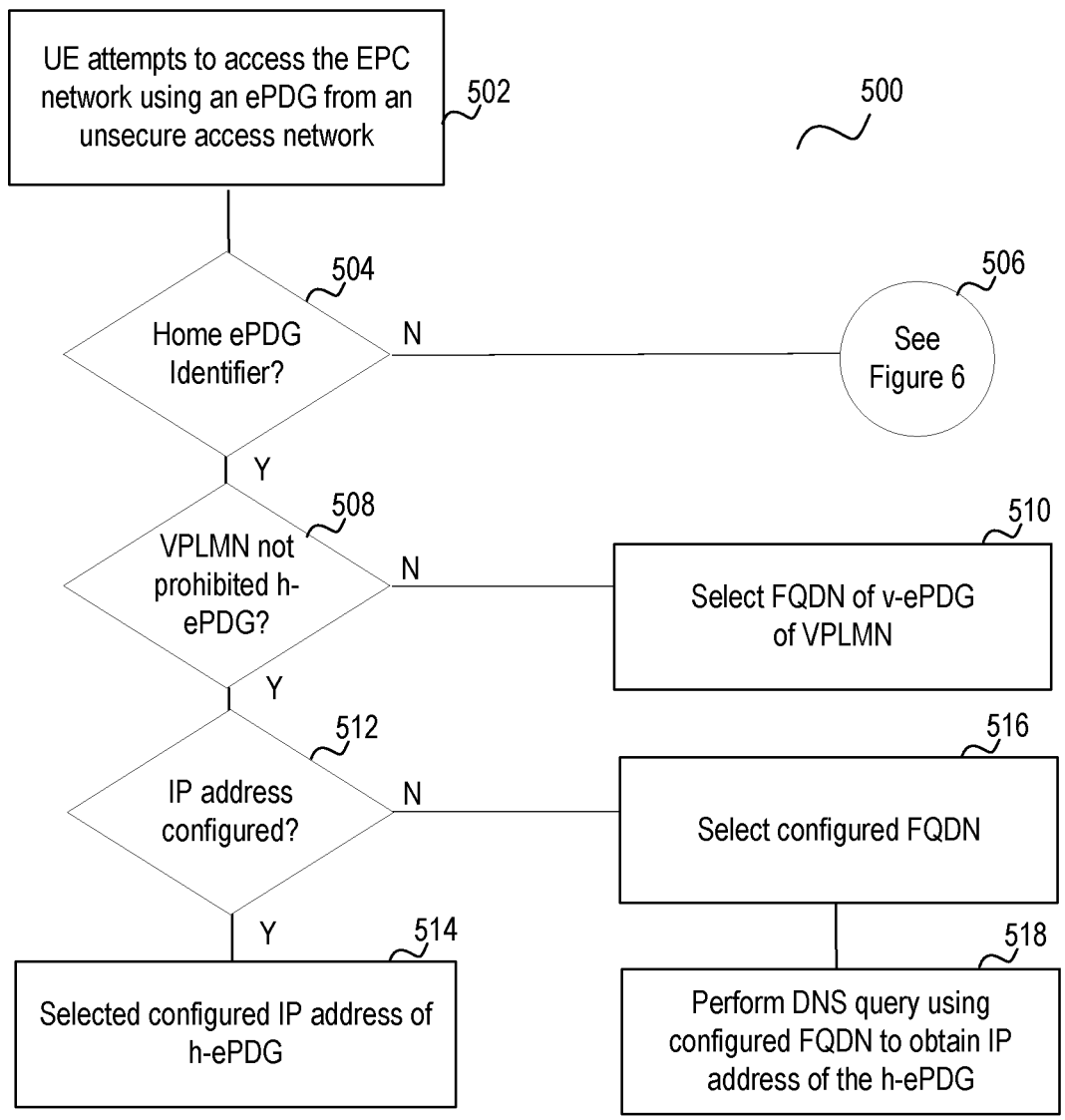
FIG. 5 illustrates a logic flow diagram of an embodiment of a method for selecting an ePDG by a UE using ePDG configuration information.

FIG. 5 illustrates a logic flow diagram of an embodiment for a method 500 for selecting an ePDG by a UE 350 using ePDG configuration information. When the UE 350 attempts to access the EPC network 100 using an ePDG, e.g. from an untrusted or unsecure or non-3GPP access network 110 as shown in 502, the UE 350 selects the ePDG using the ePDG configuration information 406. Various methods for selecting the ePDG using the ePDG configuration information 406 are now described through a person of skill in the art would understand that various other methods may be implemented alternatively or in addition to the ePDG selection processes described herein.

Using the ePDG configuration information 406, the UE 350 determines whether the home ePDG identifier parameter 408 is provisioned with identification information 410 for at least one ePDG of the HPLMN 300 as shown in 504. If not, the selection process is further described with respect to FIG. 6 as shown in 506. When the home ePDG identifier parameter 408 is provisioned with identification information 410 for at least one ePDG of the HPLMN 300 but a VPLMN 310 has indicated to the UE 350 that an h-ePDG of the HPLMN 300 may not be selected or the UE is prohibited from selecting a h-ePDG (e.g., the UE is attached to the VPLMN 310 and must select a v-ePDG) as shown in 508, then the UE 350 selects a FQDN from the FQDN_format 430 of a v-ePDG from the VPLMN 310.

When the UE 350 may select a h-ePDG provisioned with respect to the home ePDG identifier parameter 408, the UE 350 determines whether an IP address is configured for the h-ePDG as shown in 512. When the IP address is present, the UE selects an IP address of the h-ePDG as shown in 514. In one aspect, the UE 350 selects a same IP version for the h-ePDG as its local IP address. When the IP address is not configured, the UE 350 uses a configured FQDN as shown in 516 and runs a DNS query to obtain the IP address(es) of the selected h-ePDG(s) as shown in 518. If tunnel establishment to the selected h-ePDG in the HPLMN 300 fails, the UE may select another h-ePDG provisioned with respect to the home ePDG identifier parameter 408. The UE 350 may then repeat attempts for a tunnel establishment attempt using the next FQDN or IP address(es) of the next selected h-ePDG in the HPLMN 300.

By configuring the Home EPDG Identifier 408 with identification information 410 for one or more h-ePDGs, an HPLMN 300 may control the UE to select a particular ePDG or one or more ePDGs from a set of ePDGs. The HPLMN 300 thus has more control over the ePDG selection process by provisioning the UE 350 with identification information 410 for one or more h-ePDGs.

Figure 6:
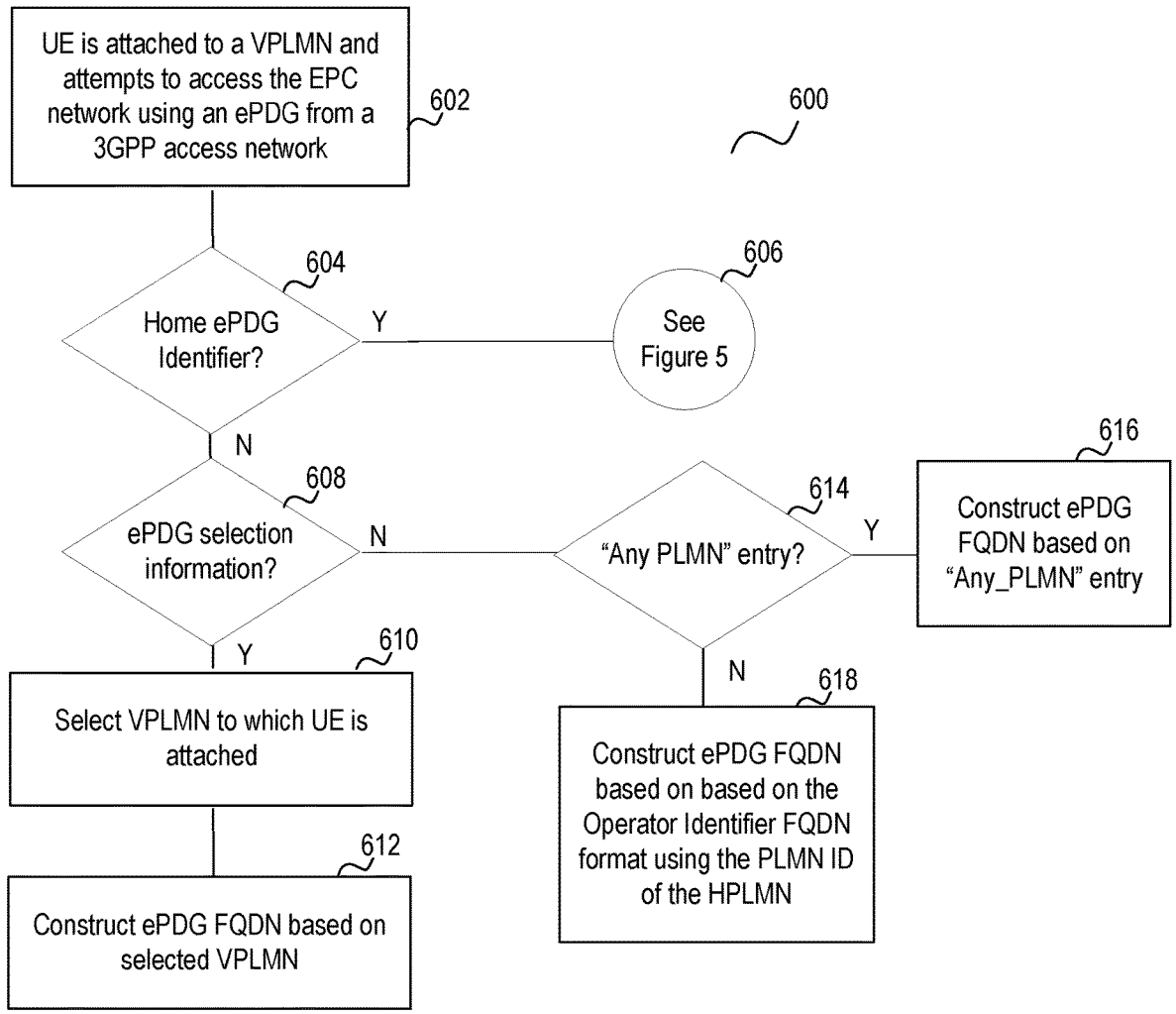
FIG. 6 illustrates a logic flow diagram of an embodiment of a method for selecting an ePDG when the home ePDG identifier parameter is not available.

FIG. 6 illustrates a logic flow diagram of another embodiment for a method 600 for selecting an ePDG by a UE 350 when the home ePDG identifier parameter 408 is not available. As shown in 602, the UE 350 is attempting to access the EPC network using an ePDG, and the UE 350 is attached to a VPLMN 310 via a 3GPP access network 104. When a home ePDG identifier 408 is available as shown in 504, then the selection process proceeds as described with respect to FIG. 5 as shown in 606. When a home ePDG identifier 408 is not available as shown in 604, e.g. the home ePDG identifier parameter 408 is not present or not provisioned with any identification information 410, then the UE 350 determines whether ePDG selection information 422 is present for the VPLMN 310 to which the UE is attached. For example, the UE 350 determines whether a VPLM parameter 426 with a VPLMN ID for the VPLMN 310 to which the UE is attached is present, as shown in 608. If so, the UE 350 selects the VPLMN ID as shown in 610. As shown in 612, the UE determines the FQDN format 430 associated with the VPLMN ID and constructs an ePDG FQDN based on the configured FQDN format 430.

When the UE 350 determines that the ePDG selection information 422 is not available for the VPLMN 310 to which the UE is attached in 608, e.g. an entry for the VPLMN 310 is not available in the ePDG selection information 422, and no entry matches an equivalent VPLMN(s), the UE determines whether an 'Any_PLMN' entry is available in the ePDG selection information 422 as shown in 614. When an "Any_PLMN" entry is available, the UE 350 constructs an ePDG FQDN based on the configured FQDN format of the 'Any_PLMN' entry as shown in 616.

When an entry for the VPLMN 310 or an e-VPLMN is not available and an "Any_PLMN' entry is not available in the ePDG selection information 422 and the VPLMN 310 has not indicated to the UE 350 that the ePDG of the HPLMN 300 shall not be selected, the UE 350 constructs an ePDG FQDN based on the Operator Identifier FQDN format using the PLMN ID of the HPLMN 300 as shown in 618.

If tunnel establishment to the selecting ePDG in the VPLMN 310 that the UE is attached to fails, the UE 350 may construct an ePDG FQDN based on the Operator Identifier FQDN format using the PLMN ID of the HPLMN 300. The UE may then use a DNS server function to resolve the constructed ePDG FQDN to the IP address(es) of the h-ePDG(s) of its HPLMN 300.

Figure 7:
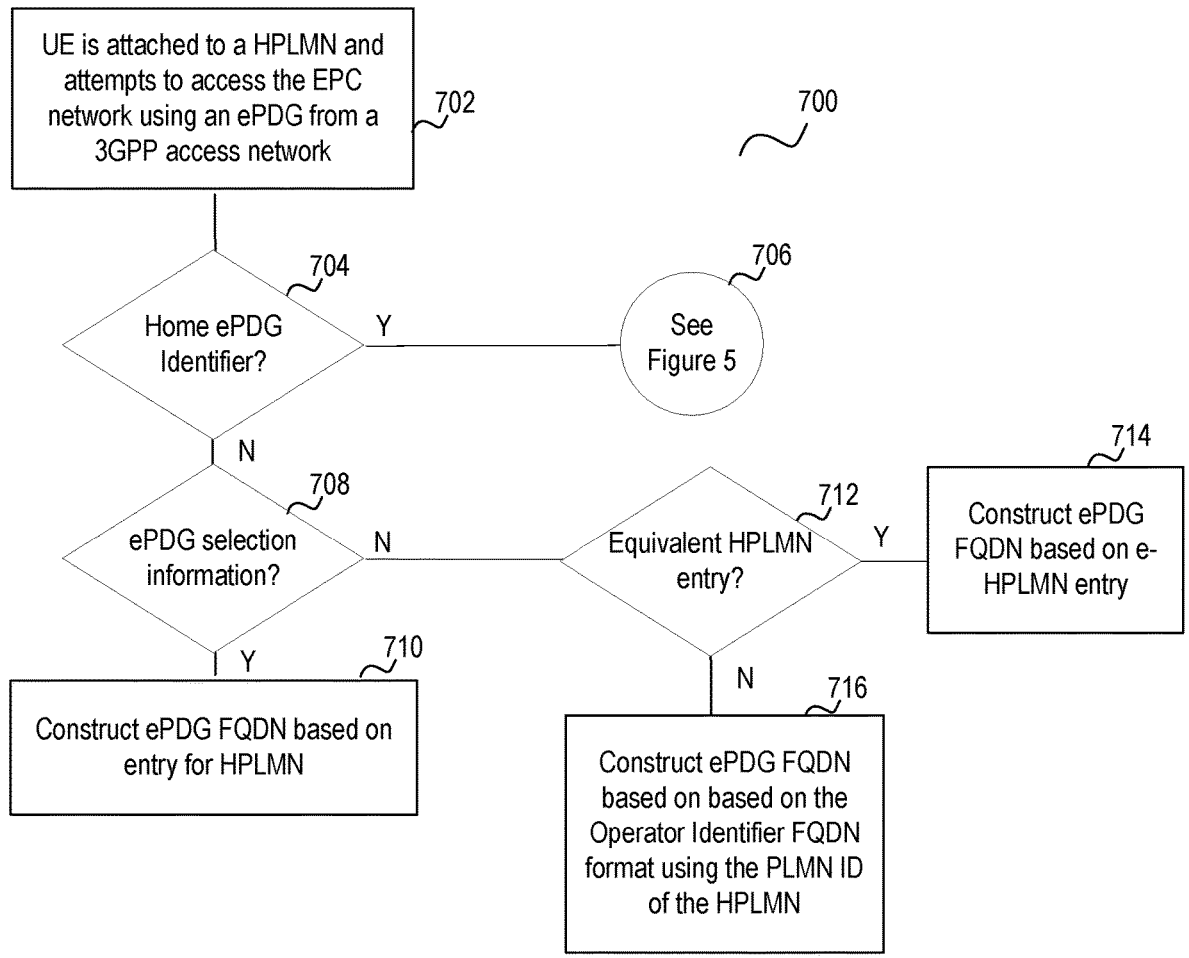
FIG. 7 illustrates a logic flow diagram of an embodiment of a method for selecting an ePDG when the UE is attached to a HPLMN via a 3GPP access network.

FIG. 7 illustrates a logic flow diagram of another embodiment for a method 700 for selecting an ePDG by a UE 350 when the UE 350 is attached to its HPLMN 300 via a 3GPP access network 104. When the home ePDG identifier parameter 408 is available as shown in 704, the selection process may proceed as described with respect to FIG. 5 as shown in 706. When the home ePDG identifier parameter 408 is not available as shown in 704, e.g. the parameter is not configured or is not provisioned, the UE 350 may determine whether an entry for its HPLMN 300 is present in the ePDG selection information 422 as shown in 708. When the UE 350 is attached to its HPLMN 300 and an entry for the HPLMN 300 is available in the ePDG selection information 422, the UE 350 may construct an ePDG FQDN based on the configured FQDN format 430 of the entry for its HPLMN 300 as shown in 710. When an entry for the HPLMN 300 is not available in the ePDG selection information 422, and the UE determines an entry for an equivalent HPLMN(s) is available in the ePDG selection information 422 as shown in 712, the UE 350 may construct an ePDG FQDN based on the configured FQDN format of its equivalent HPLMN 300 as shown in 714. When an entry for the HPLMN 300 is not available in the ePDG selection information 422 as shown in 708, and no entry in the ePDG selection information 422 matches any of its equivalent HPLMN(s) as shown in 712, the UE 350 may construct an ePDG FQDN based on the Operator Identifier FQDN format using the PLMN ID of the HPLMN 300 as shown in 716.

When the home ePDG identifier parameter 408 is not available, e.g. the parameter is not configured or is not provisioned, and the UE 350 is not attached to a PLMN via 3GPP access, and the UE uses a non-trusted access network (such as a WLAN), the UE may construct an ePDG FQDN based on the Operator Identifier FQDN format using the PLMN ID of the HPLMN 300. The UE 350 may then use a DNS server function to resolve the constructed ePDG FQDN to the IP address(es) of the ePDG(s).

When the ePDG configuration information is not configured on the UE, or the ePDG configuration information is configured but empty, then the UE 350 may construct the ePDG FQDN based on the Operator Identifier FQDN format using the PLMN ID of the HPLMN 300 stored on the USIM, and the UE 350 may use the DNS server function to resolve the constructed ePDG FQDN to the IP address(es) of the ePDG(s).

Upon reception of a DNS response containing one or more IP addresses of a selected ePDGs, the UE 350 may select an IP address of ePDG with the same IP version as its local IP address. When tunnel establishment with the selected ePDG fails, e.g. the UE 350 does not receive a response to an IKE_SA_INIT request message sent towards to any of the received IP addresses of the selected ePDG, then the UE 350 may repeat the ePDG selection process as described herein, excluding the previously selected ePDG. The UE 350 may select only one ePDG also in case of multiple PDN connections. However, during handover between two untrusted non-3GPP access networks, the UE 350 may initiate tunnel establishment to another ePDG while still being attached to the current ePDG.

In one or more embodiments herein, the UE 350 is configured with a DNS server function to resolve a constructed ePDG FQDN to obtain an IP address(es) of the ePDG(s). In general, the UE 350 may select an IP address of an ePDG with the same IP version as its local IP address.

A UE may receive a request for an emergency services session when attached to a non-trusted access network 110. For example, the UE 350 detects that the target URI or that the dialed digits correspond to an emergency call. In an emergency session, the UE establishes an emergency PDN connection over the non-trusted access network 100. In one or more embodiments described herein, the UE first selects an ePDG that supports emergency services based on ePDG configuration information.

Figure 8:
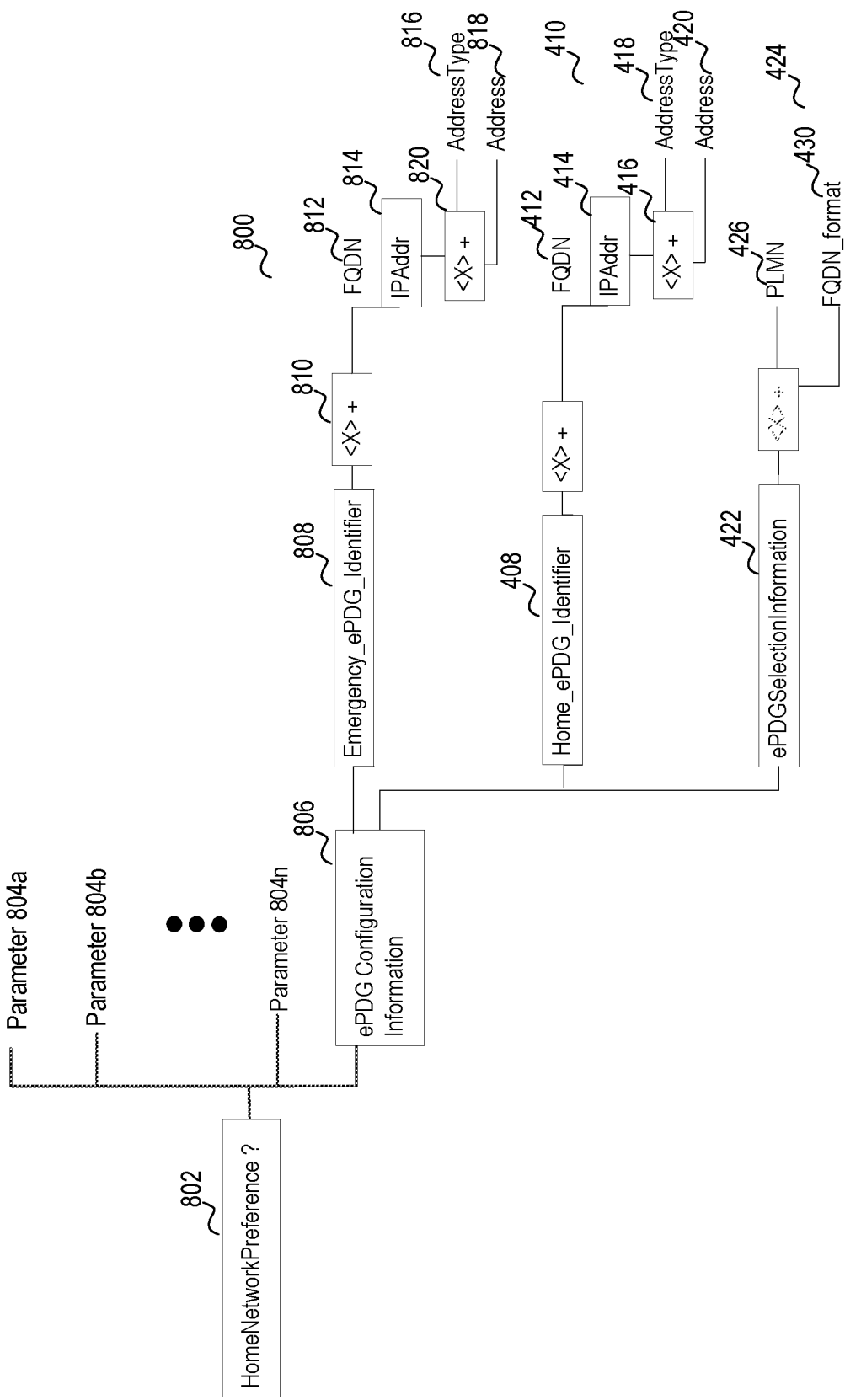
FIG. 8 illustrates a schematic block diagram of another embodiment of home network preference information.

FIG. 8 illustrates a schematic block diagram of another embodiment of Home Network Preference information 802. The ePDG configuration information 806 includes the home ePDG identifier parameter 408 or the ePDG selection information parameter 422 or both as described previously herein. In addition, the ePDG configuration information 806 further includes ePDG Emergency Services configuration information 800. The ePDG emergency services configuration information 800 includes an emergency EPDG Identifier 808 that indicates a list of one or more ePDGs in the UE's HPLMN 300 that support emergency services. The first <X> interior node 810 acts as a placeholder for the FQDN 812 or IP address configuration 814 of the ePDG in the UE's HPLMN 300 that supports emergency service. The FQDN parameter 812 indicates the FQDN of an ePDG in the UE's HPLMN 300 that supports emergency service. The IPAddr parameter 814 indicates a list of one or more IP addresses of ePDGs in the UE's HPLMN 300 that support emergency service. The second <X> interior node 820 indicates a list of at least one IP address of an ePDG in the UE's HPLMN 300 that supports emergency service. The AddressType parameter 816 indicates the IP version of the at least one IP address of an ePDG in the UE's HPLMN 300 that supports emergency service, such as 'IPv4' or 'IPv6'. The Address parameter 818 indicates the at least one IP address of the ePDG in the UE's HPLMN 300 that supports emergency service.

In an embodiment, the UE 350 selects an ePDG that supports emergency services using the configured ePDG Emergency Services configuration information 800. For example, the UE 350 may receive a request for an emergency services session over a non-3GPP access 106 or non-trusted access network 110 and selects an ePDG that supports emergency services using the configured ePDG Emergency Services configuration information 800.

Figure 9:
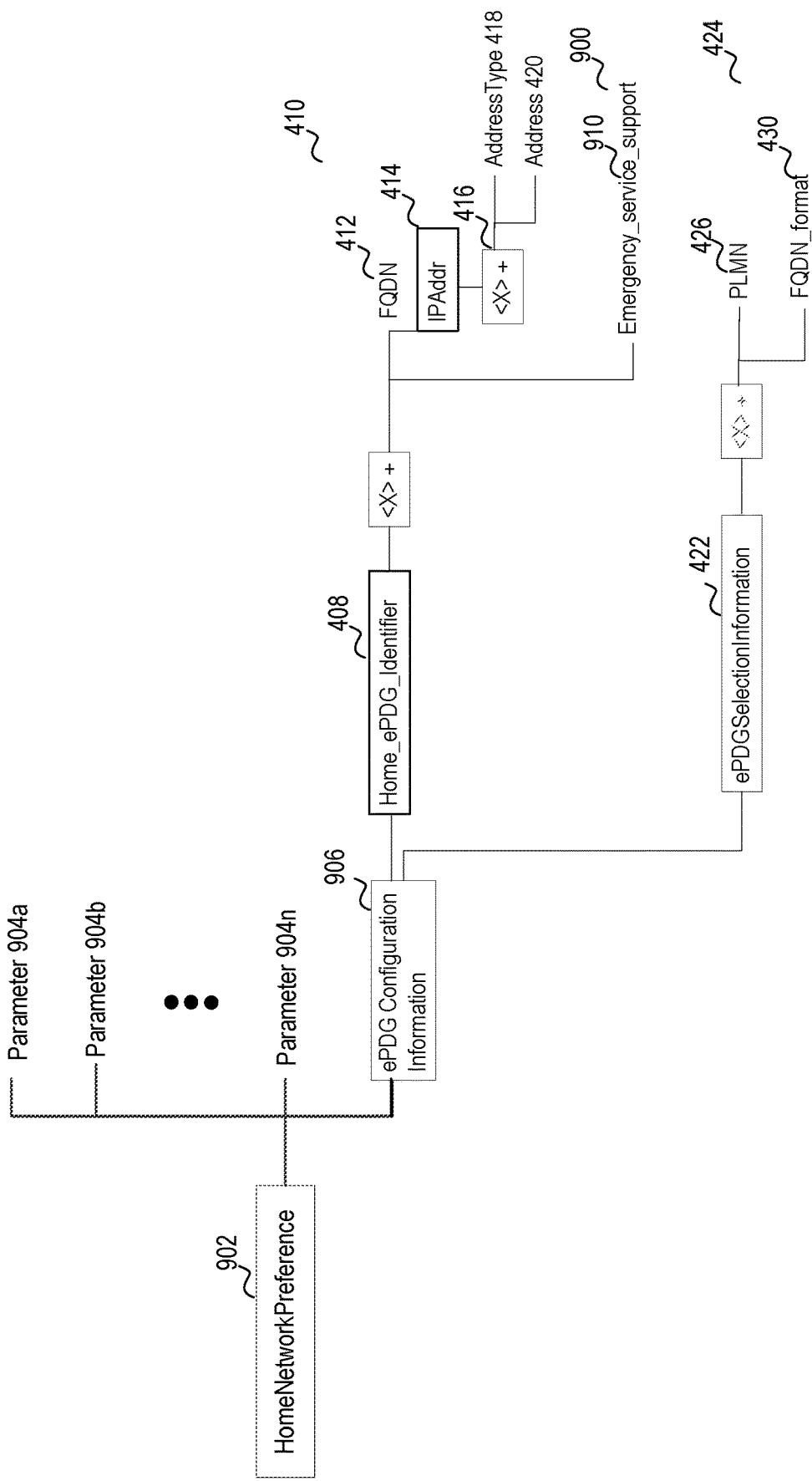
FIG. 9 illustrates a schematic block diagram of another embodiment of home network preference information.

FIG. 9 illustrates a schematic block diagram of another embodiment of Home Network Preference information 902. The ePDG parameter 906 has sub-nodes including the home ePDG identifier parameter 408 or the ePDG selection information parameter 422 or both as described previously herein. In addition, the home ePDG identifier parameter 408 includes ePDG emergency services configuration information 900. The ePDG emergency services configuration information 900 includes an emergency EPDG Identifier 808 that indicates the one or more ePDGs listed under the Home ePDG Identifier 408 in the UE's HPLMN 300 that support emergency services. For example, for each identified ePDG under the Home ePDG identifier parameter 408, the emergency service support parameter 910 indicates whether the listed ePDG in the HPLMN 300 supports emergency service. The emergency service support parameter 910 is thus associated with each ePDG in the list of one or more ePDGs in the Home ePDG Identifier 408 that indicates whether the associated ePDG provides support for emergency services.

Thus, the ePDG emergency services configuration information 800 described with respect to FIG. 8 and the ePDG emergency services configuration information 900 described with respect to FIG. 9 both indicate one or more ePDGs in the UE's HPLMN 300 that support emergency services. The type of parameters shown in the ePDG emergency services configuration information 800, 900 are merely exemplary, and other types of parameters or configuration may be implemented to indicate one or more ePDGs in the UE's HPLMN 300 that support emergency services. For example, the ePDG emergency services configuration information 800, 900 may include a list of one or more ePDGs. The UE 350 then selects from the one or more ePDGs to establish an emergency services session. The list of ePDGs could be a prioritized list, in which case, selection of ePDG is based on priority, e.g. wherein an ePDG with a highest priority is selected first. Other types of parameters or configuration may be also implemented.

Figure 10:
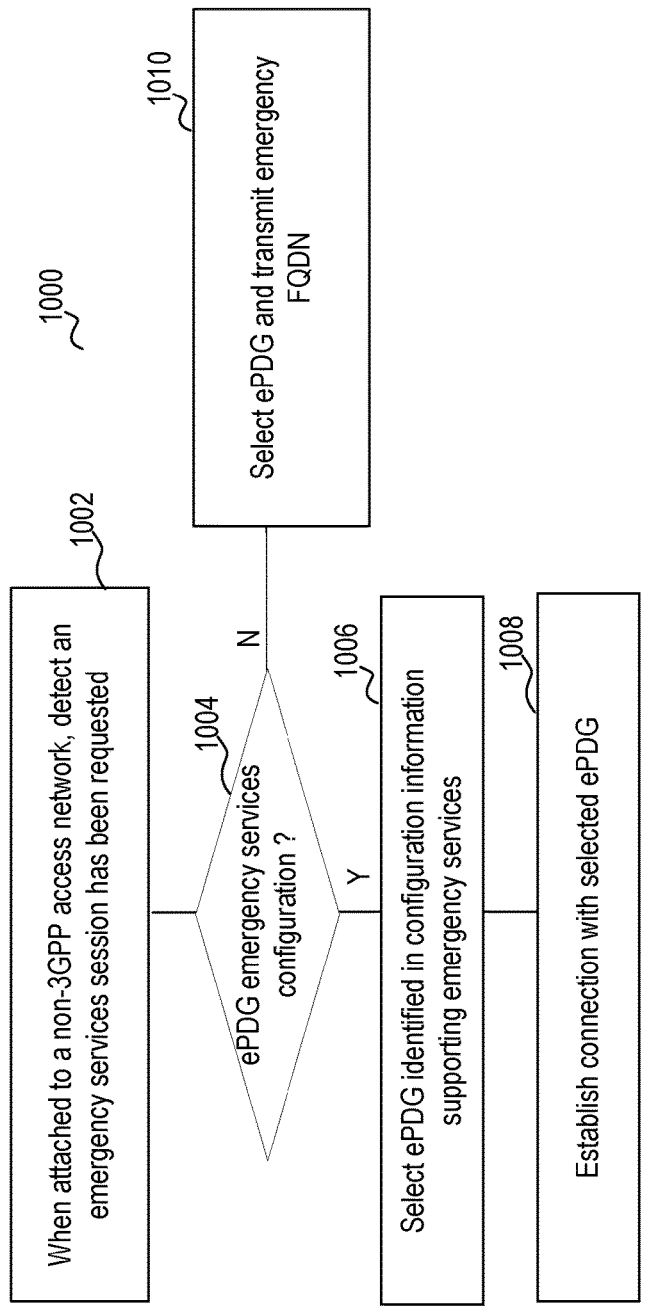
FIG. 10 illustrates a logical flow diagram of an embodiment of a method for selection of an ePDG that supports emergency services.

FIG. 10 illustrates a logical flow diagram of an embodiment of a method 1000 for selection of an ePDG that supports emergency services. The UE 350 detects that an emergency session has been requested as shown in 1002. When the UE detects that an emergency session has been requested, the UE 350 selects an ePDG from the UE's home PLMN that can support emergency services for tunnel establishment. For example, the UE 350 may be attached to a non-3GPP access network 106 that is untrusted or otherwise needs to connect to the EPC 100 through an ePDG that supports emergency services.

The UE 350 determines whether the ePDG emergency services configuration information 800, 900 is provisioned with one or more ePDGs that support emergency services as shown in 1004. For example, the UE 350 determines whether the Emergency ePDG identifier 808 is provisioned as part of the ePDG configuration parameter 806 or stored in the USIM or the emergency service support parameter 910 is provisioned as part of the Home ePDG Identifier 408.

When the emergency ePDG identifier 808 is included as part of the ePDG configuration parameter 806 or stored in the USIM or the emergency service support parameter 910 is provisioned (or other configuration means is used to indicate an ePDG with emergency services capability), the UE 350 selects an ePDG that supports emergency services, e.g. using the ePDG emergency services configuration information 800, 900 as shown in 1006. The UE 350 then establishes a connection with the selected ePDG as shown in 1008. For example, the UE 350 may initiate an IKEv2 tunnel establishment procedure towards the selected ePDG (e.g., transmit an IKE_SA_INIT request message). The UE 350 may need to disconnect any existing IPsec tunnel with an ePDG prior to establishing a new tunnel with the selected ePDG. Upon receipt of an initiate response, the UE 350 transmits an authorization request (e.g., an IKE_AUTH request message) to the selected ePDG with an emergency indication attribute (EMERGENCY_IND attribute), shown in more detail with respect to FIG. 11. When the emergency registration expires, the UE 350 disconnects the emergency session and release the tunnel.

When the UE 350 does not receive a response to an IKE_SA_INIT request message sent towards the selected ePDG, then the UE 350 may repeat the ePDG selection process shown in FIG. 10, excluding the previously selected ePDG for which the UE did not receive a response. The UE 350 may stop the establishment of emergency session if it is unable to select an ePDG for emergency bearer services.

When the UE 350 determines that the ePDG emergency services configuration information 800, 900 is not provisioned or does not indicate one or more ePDGs that support emergency services as shown in 1004, then the UE 350 may select an ePDG using one or more other methods described herein as shown in 1010. The UE 350 may transmit an emergency FQDN to a DNS server to obtain an IP address for the selected ePDG.

Figure 11:
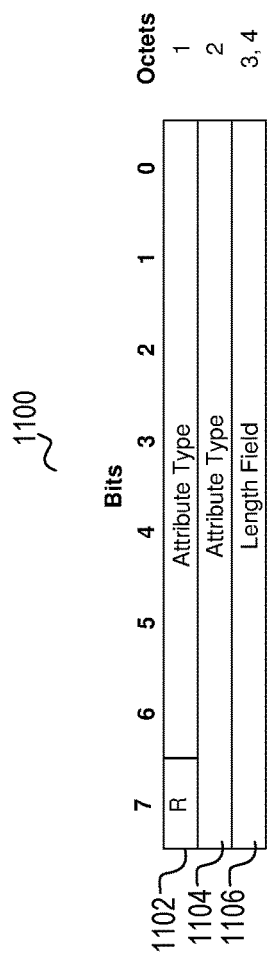
FIG. 11 is a schematic block diagram of an embodiment of an emergency indication attribute.

FIG. 11 is a schematic block diagram of an embodiment of an emergency indication attribute 1100. The emergency indication attribute 1100 may be included in a request for tunnel establishment for an emergency services session. The emergency indication attribute 1100 indicates that the requested connection is for an emergency service. In an embodiment, the emergency indication attribute 1100 is included in an IKE_AUTH request message in an IKEv2 tunnel establishment procedure. The emergency indication attribute 1100 includes an R field 1102 that is a reserved bit and a length field 1104. The emergency indication attribute 1100 further includes an attribute type field 1102, shown e.g., as Bits 0-6 of Octet 1 and Octet 2. The attribute type field 1102 includes a value set to indicate an emergency session. Though the emergency indication attribute 1100 is described herein, alternative fields or types of indicators may be used to indicate establishment of a connection for emergency services.

Embodiment of ePDG Configuration and Selection for Lawful Intercept

Figure 12:
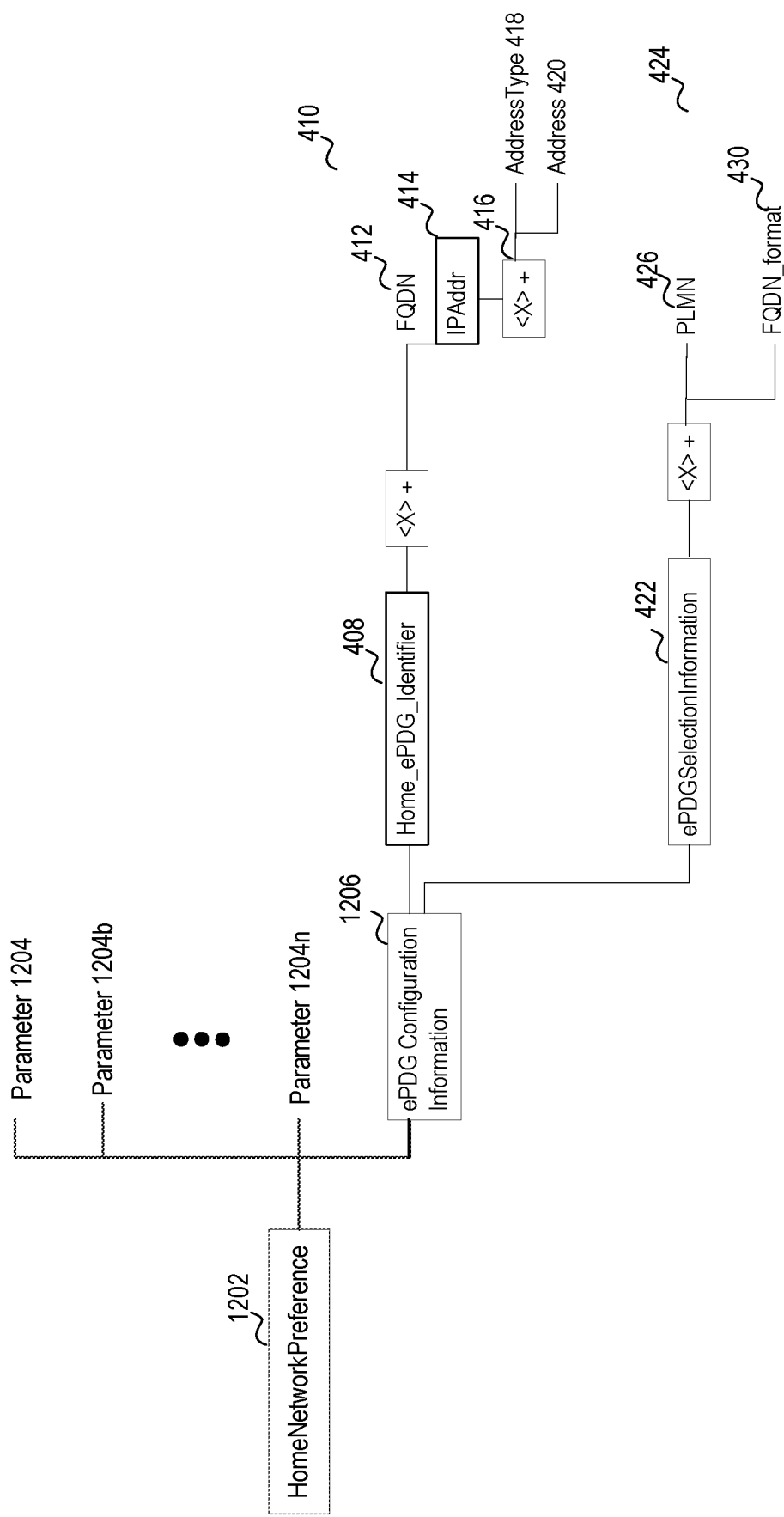
FIG. 12 illustrates a schematic block diagram of another embodiment of home network preference information.

FIG. 12 illustrates a schematic block diagram of another embodiment of Home Network Preference information 1202. The home network preference information 1202 includes a plurality of parameters 1204a-n and the ePDG configuration information 1206. As described herein, the ePDG configuration information 1206 includes various parameters, such as the home ePDG identifier parameter 408 and the ePDG selection information parameter 422.

The ePDG selection information parameter 422 includes PLMN information 424 for one or more PLMNs, including VPLMNs 310 and/or HPLMN 300 of the UE 350. The PLMN parameter 426 lists or identifies one or more PLMNs and may list an identification of a single PLMN, e.g. include a specific PLMN ID, or may identify a set of PLMNs, e.g. include a value of "Any PLMN". For an identified PLMN in the PLMN parameter 426, the PLMN information 424 includes a FQDN format 430 parameter that lists FQDN formats for the PLMN.

In an embodiment, PLMNs that have roaming agreements with the UE's HPLMN 300 for interworking with non-trusted access networks (such as certain WLANs) are provisioned in the ePDG selection information 422. The UE's HPLMN 300 may also be included in the list of PLMNs.

For lawful interception, a law enforcement agency provides the service operator with a court order or other legal document to intercept data communications of the UE. The PLMN then intercepts the UE's data communications, copies the data communications, and provides the data communications to the law enforcement agency. The data communications of the UE must be routed through a network element that supports lawful interception.

In an embodiment, the UE performs ePDG selection to support lawful interception based on the country in which the UE is currently located. For example, for selection of the ePDG, the country in which the UE is located is first determined, and then the ePDG is selected based on its country of location and the ePDG configuration information 1206.

Figure 13:
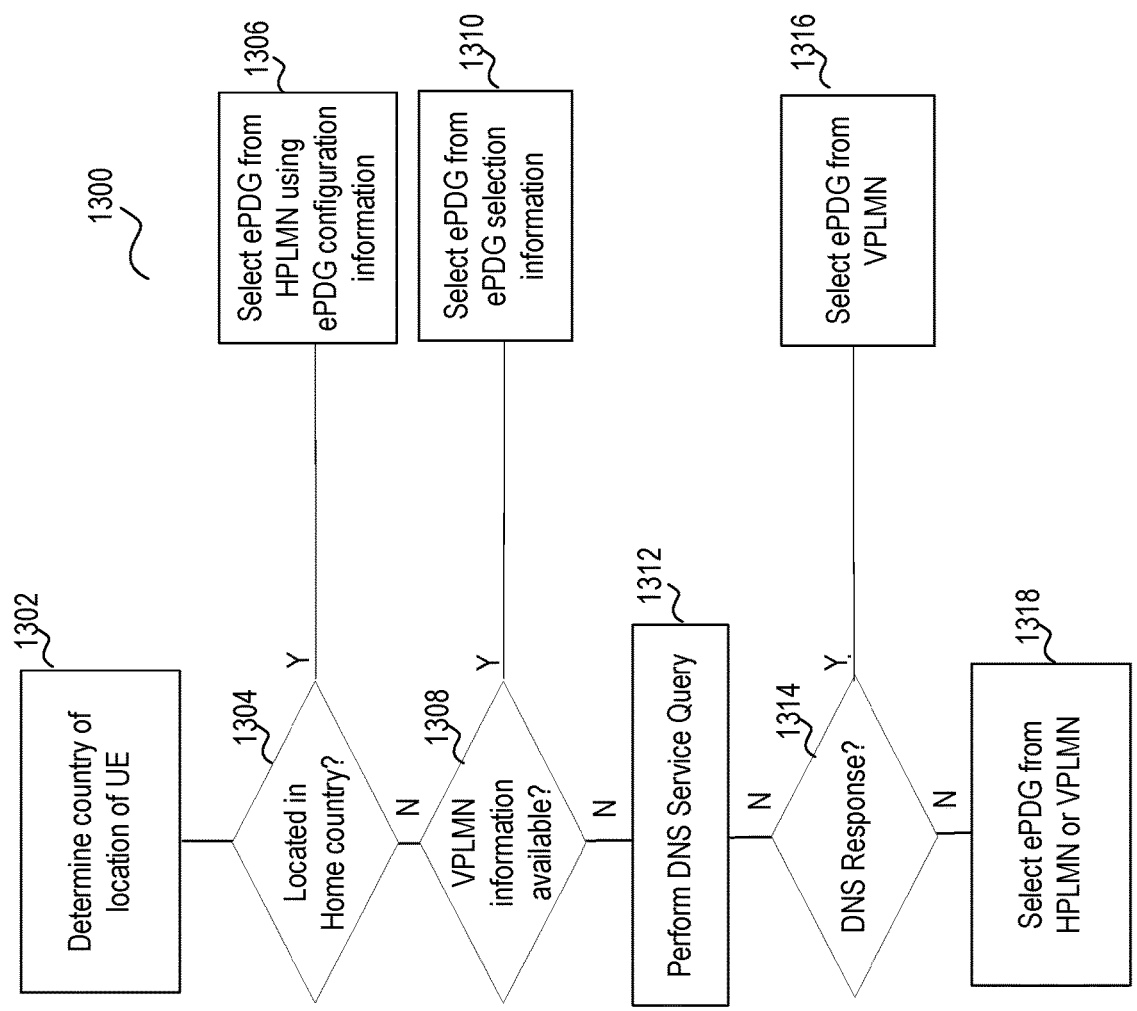
FIG. 13 illustrates a logical flow diagram of an embodiment of a method for selection of an ePDG based on a UE's country of location and ePDG configuration information.

FIG. 13 illustrates a logical flow diagram of an embodiment of a method 1300 for selection of an ePDG based on a UE's country of location and ePDG configuration information 1206. In an embodiment, the country in which the UE 350 is currently located is determined as shown in 1302. The country may be determined using one or more methods as described herein or using alternative or additional methods.

For example, when the UE 350 is attached to a PLMN via a 3GPP access network 104, the UE 350 determines the country in which it is located by comparing the MCC code of the UE's registered PLMN (RPLMN) and the MCC code of the UE's International Mobile Subscriber Identity (IMSI). When the ISO country code derived from the MCC code of the UE's RPLMN matches the ISO country code derived from the MCC code of the UE's IMSI, the UE 350 may determine that it is located in its home country. When the two-letter ISO country code derived from the MCC code of the UE's RPLMN does not match the two-letter ISO country code derived from the MCC code of the UE's IMSI, the UE may determine that it is not located in its home country.

In another example, when the UE 350 is not attached to a PLMN via a 3GPP access network 104, and an ISO country code is received from an Access Point of a WLAN (e.g., the ISO country code is generally an element in Beacon and Probe Response frames), the UE 350 may determine the country it is located in by comparing the received ISO country code from the WLAN and the MCC code of the UE's IMSI. In another example, the UE may use other implementation specific means to determine the country in which it is located.

When the UE 350 determines that it is located in its home country as shown in 1304, the UE 350 selects an ePDG from the UE's HPLMN 300 using ePDG configuration information 906, as shown in 1306. Further details of selection of an ePDG from the UE's HPLMN 300 is described with respect to FIG. 14 below.

Figure 14:
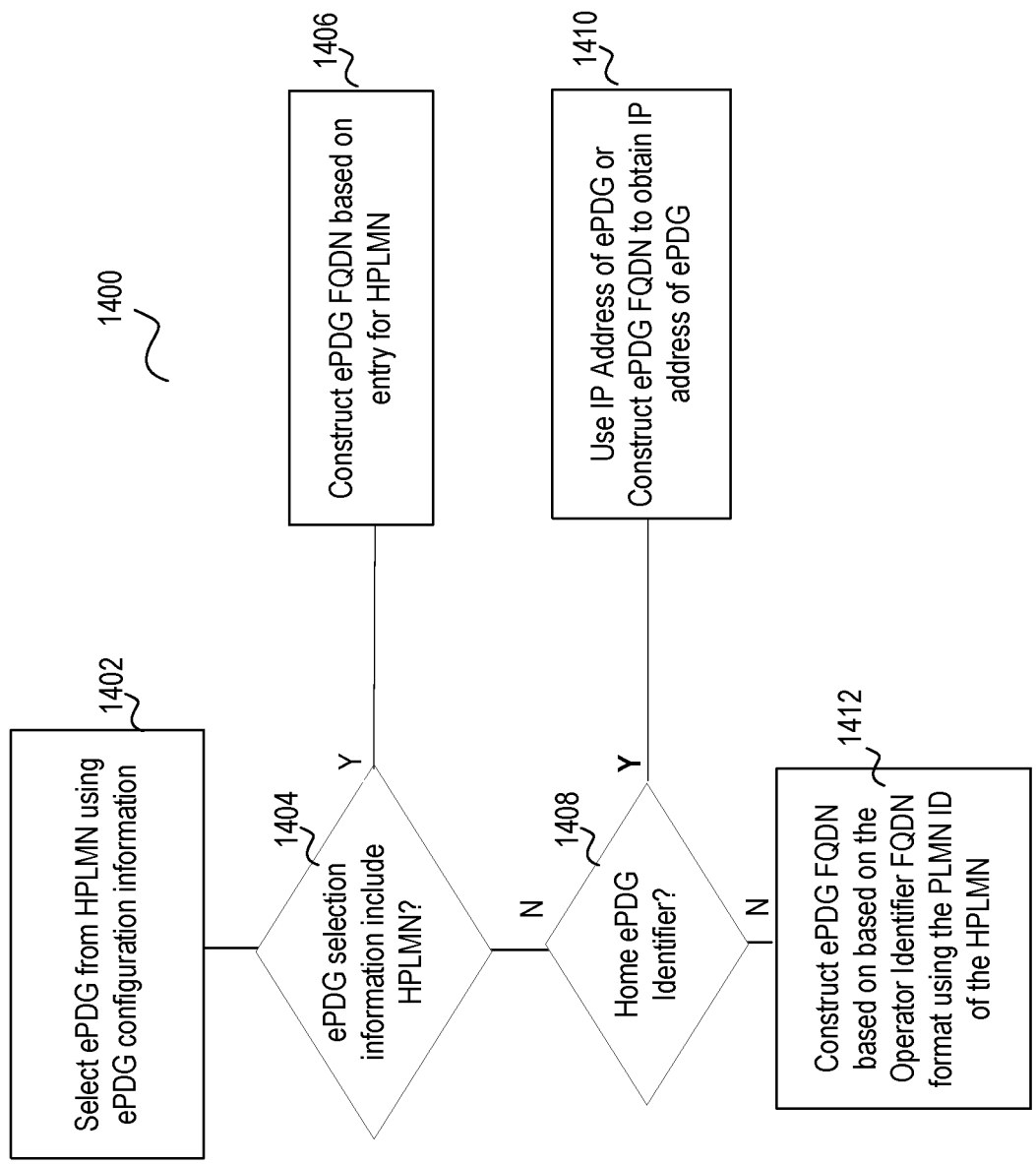
FIG. 14 illustrates a logical flow diagram of another embodiment of a method for selection of an ePDG from a UE's HPLMN using ePDG configuration information.

FIG. 14 illustrates a logical flow diagram of another embodiment of a method 1400 for selection of an ePDG from the UE's HPLMN 300 using ePDG configuration information 1206. In an embodiment, e.g., the ePDG is located within its country of origin or within its HPLMN 300. When the ePDG selection information 422 is provisioned with an entry for the HPLMN 300 as shown in 1404, the UE 350 may then construct an ePDG FQDN based on the configured FQDN format of the HPLMN 300 as shown in 1406. When the ePDG selection information 422 is not provisioned or no entry is available for the HPLMN 300 in the ePDG selection information 422 as shown in 1404, the UE 350 determines whether the home ePDG identifier 408 is provisioned as shown in 1408. When the home ePDG identifier 408 includes an entry for the HPLMN 300 as shown in 1408, the UE 350 may use a configured IP address to select an h-ePDG from the HPLMN 300 or use a configured FQDN and run DNS query to obtain an IP address(es) of the ePDG(s) as shown in 1410. The UE 350 may select an IP address of the ePDG with the same IP version as its local IP address. When the home ePDG identifier 408 is not provisioned in the ePDG configuration information 1206 as shown in 1408, the UE 350 may construct an ePDG FQDN based on the Operator Identifier FQDN format using the PLMN ID of the HPLMN 300 as shown in 1412. The UE 350 may then request a DNS server function to resolve the constructed ePDG FQDN to the IP address (es) of the ePDG(s).

Referring back to FIG. 13, when the UE 350 is not located in its home country as shown in 1304, and the UE 350 is attached to a VPLMN 310 via a 3GPP access network 104, the UE 350 determines whether VPLMN information is available in the ePDG selection information 1308 as shown in 1308. The VPLMN information may include an entry for the VPLMN 310 or an entry for "Any PLMN". When VPLMN information is available in the ePDG selection information 422 as shown in 1308, the UE 350 selects an ePDG from the VPLMN 310 as shown in 1310. The UE 350 either constructs an ePDG FQDN based on the configured FQDN format of the VPLMN entry when available or constructs an ePDG FQDN based on the configured FQDN format of the 'Any_PLMN' entry. The UE 350 may then use a DNS server function to resolve the constructed ePDG FQDN to the IP address(es) of the ePDG(s) for the VPLMN 310. The UE shall select an IP address of an ePDG with the same IP version as its local IP address.

In an embodiment, when the UE 350 determines that it is not located in its home country as shown in 1304 and no VPLMN information is available as shown in 1308 (or the UE is attached using a non-trusted access network 110 or the ePDG selection information 422 is not provisioned), the UE 350 performs a DNS based service discovery query as shown in 1312. The DNS based service query uses the UE's ISO country code to determine whether the visited country mandates a selection of an ePDG in its country. For example, the UE may perform a DNS based service discovery query such as a pointer (PTR) DNS query for the name epdg.epc.mcc<MCC>.visited-country.pub.3gppnetwork.org. When the DNS response includes one or more PTR records, the UE 350 may consider selection of ePDG in the visited country mandated. The one or more record in the DNS response may include the PLMN ID of a PLMN in the given MCC of the visited country which can be used for selecting an ePDG in the visited country for lawful interception. When the DNS response includes no records, the selection of an ePDG in the visited country is not mandated.

When the DNS response includes one or more records as shown in 1314, the UE 350 determines that it must select an ePDG in the visited country or VPLMN 310 as shown in 1316. One or more methods may be used to select an ePDG in the visited country or VPLMN 310 when no VPLMN information is available in the ePDG selection information 422. For example, when the UE 350 is attached to the VPLMN 310 via a 3GPP access network 104, and the PLMN ID of the VPLMN 310 is included in one of the DNS records, the UE 350 may select an ePDG in this VPLMN 310 by constructing an ePDG FQDN based on the Operator Identifier FQDN format using the PLMN ID of the VPLMN 310. In another example, when the UE 350 is not attached to a PLMN via a 3GPP access network 104 or the PLMN ID of VPLMN 310 is not included in any of the DNS records, the UE 350 may select a PLMN included in the DNS response in the ePDG selection information 422 and construct an ePDG FQDN based on the configured FQDN format 430 of the PLMN entry. When the ePDG selection information 422 is not provisioned or the ePDG selection information does not include any of the PLMNs in the DNS response, the UE 350 may select an ePDG from a PLMN included in the DNS response and construct an ePDG FQDN based on the Operator Identifier FQDN format using the PLMN ID of the PLMN.

When the DNS response includes no records as shown in 1314, the UE may select an ePDG from the VPLMN 310 or the HPLMN 300 as shown in 1318. Further details of selection of an ePDG from the VPLMN 310 or the HPLMN 300 are described with respect to FIG. 15 below.

Figure 15:
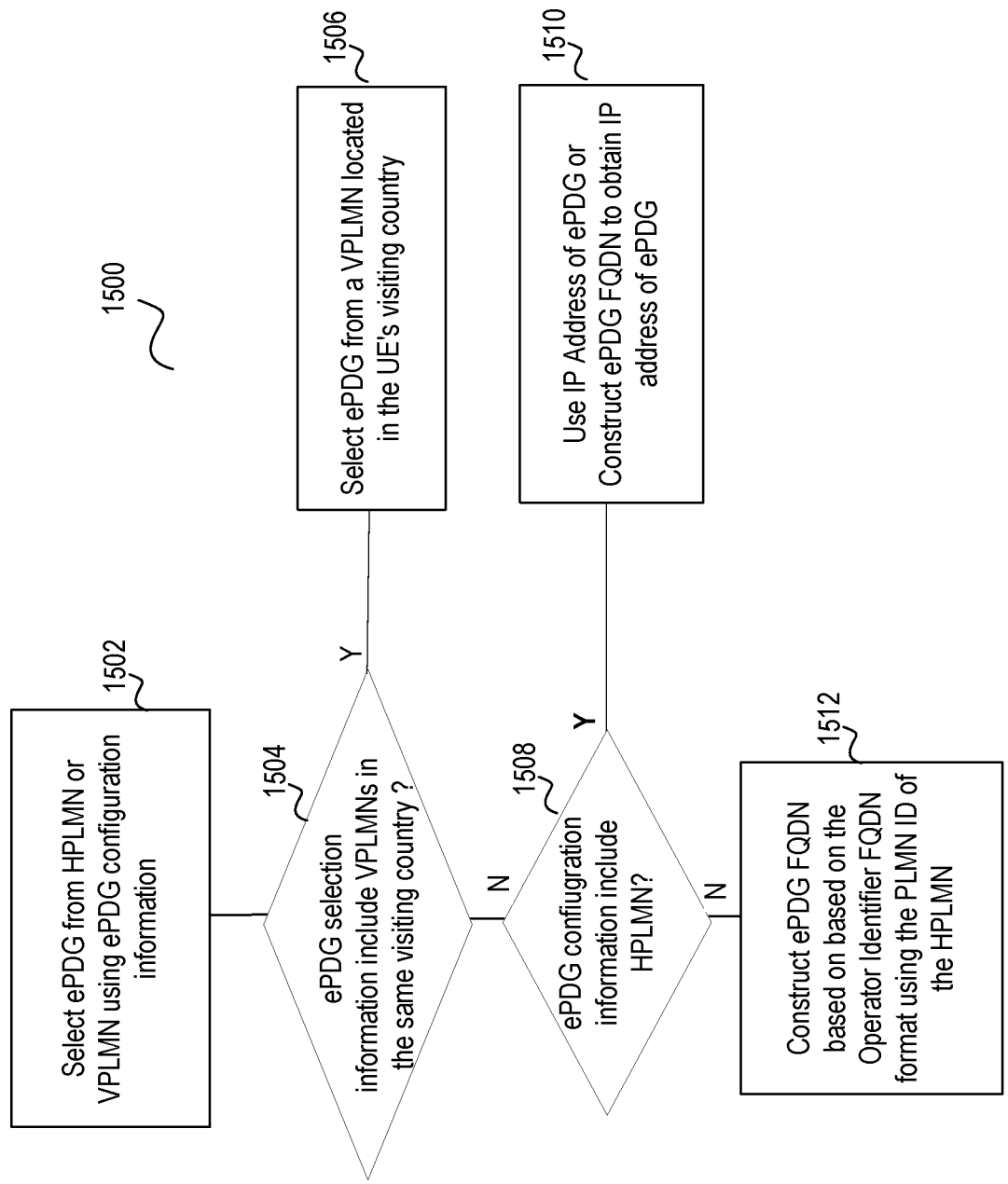
FIG. 15 illustrates a logical flow diagram of another embodiment of a method for selection of an ePDG from a VPLMN or a HPLMN using ePDG configuration information.

FIG. 15 illustrates a logical flow diagram of another embodiment of a method 1500 for selection of an ePDG from a VPLMN 310 or a HPLMN 300 using ePDG configuration information 1206. In an embodiment, the UE 350 is in a visiting country but may select an ePDG from a VPLMN 310 or HPLMN 300 using ePDG configuration information 1206 as shown in 1502. The UE 350 determines whether the ePDG selection information 422 is provisioned and includes one or more VPLMNs 310 in the visited country as shown in 1504. When ePDG selection information is provisioned, the UE 350 may select an ePDG from a VPLMN 310 that is located in the UE's visiting country 1506. When the ePDG selection information 422 is not provisioned or the ePDG selection information includes no IDs for VPLMNs 310 in the visited country as shown in 1504, the UE 350 may select an ePDG in the UE's HPLMN 300. When the UE's HPLMN 300 is provisioned in the ePDG configuration information 1206, the UE shall use the configured IP address 414 for the HPLMN 300 to select the ePDG or use the configured FQDN 412 and run a DNS query to obtain the IP address(es) of the ePDG(s) of the HPLMN 300 as shown in 1510. When the home ePDG identifier 408 is not provisioned in the ePDG configuration information 1206, the UE 350 may construct an ePDG FQDN based on the Operator Identifier FQDN format using the PLMN ID of the HPLMN 300 as shown in 1512. The UE 350 may then use a DNS server function to resolve the constructed ePDG FQDN to the IP address(es) of the ePDG (s).

In an embodiment, the ePDG selection is based on the country in which the UE is currently located. For example, for selection of the ePDG, the country in which the UE is located is first determined, and then the ePDG is selected using the UE's country location and the ePDG configuration information.

Figure 16:
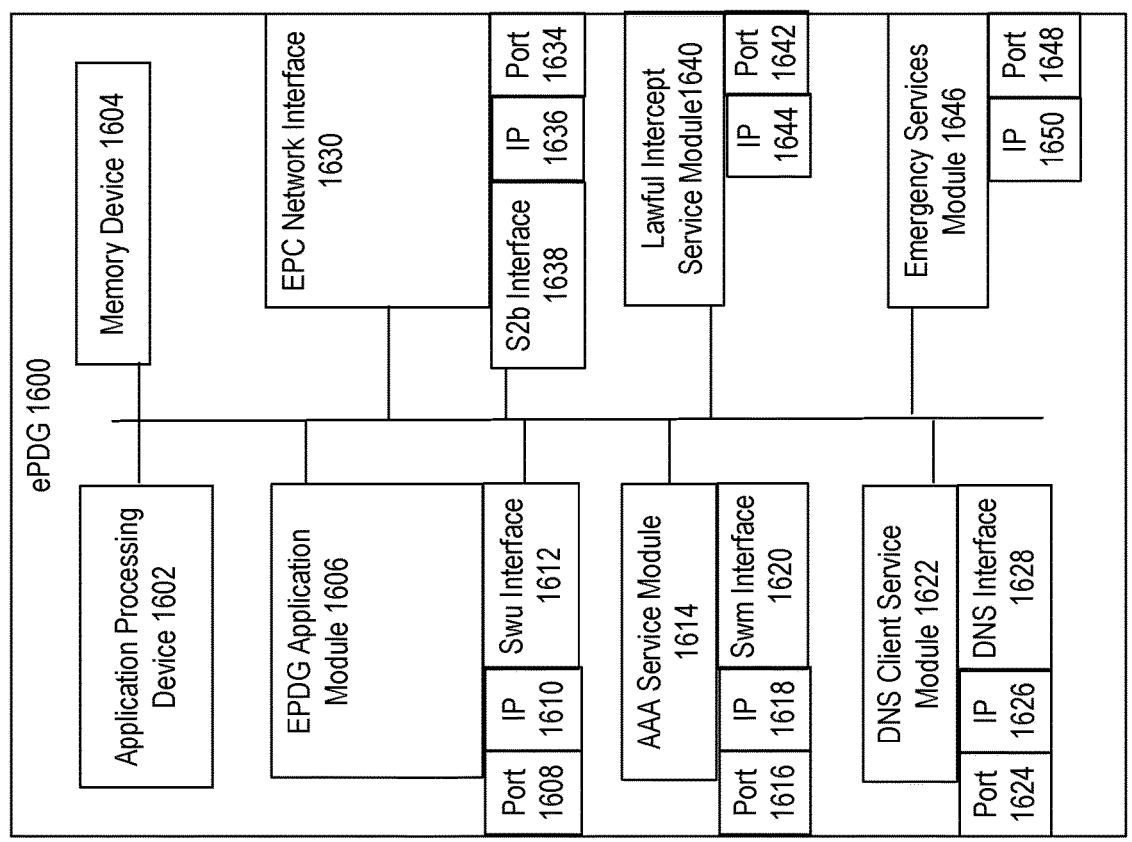
FIG. 16 illustrates a schematic block diagram of an embodiment of an ePDG.

FIG. 16 illustrates a schematic block diagram of an embodiment of an ePDG 1600. The ePDG 1600 includes an application processing device 1602 and memory device 1604. The ePDG further includes an ePDG application module 1606 configured to perform one or more functions described herein with respect to the ePDG. The ePDG application module 1606 may be communicatively coupled to an Swu interface 1612, IP interface 1610 and Ethernet port 1608. The ePDG 1600 may further include an authorization, authentication and accounting (AAA) Service module that performs authentication, authorization and access functions. The AAA service module 1606 may be communicatively coupled to an Swm interface 1620, IP interface 1618 and Ethernet port 1616.

The ePDG 1600 may further include a DNS client service module 1622 for interfacing with a DNS server. The DNS client service module 1622 may be communicatively coupled to a DNS interface 1628, IP interface 1626 and Ethernet port 1624. The ePDG 1600 may further include an EPC network interface 1630 that communicates with a PDN gateway in the EPC network. The EPC network interface 1630 may be communicatively coupled to a S2b interface 1638, IP interface 1636 and Ethernet port 1634.

The ePDG 1600 may further include a lawful intercept service module 1640 configured to support lawful intercept services. The lawful intercept service module 1640 module 1640 may be communicatively coupled to an IP interface 1644 and Ethernet port 1642. The ePDG 1600 may further include an emergency services module 1646 configured to support emergency service sessions. The emergency services module 1646 may be communicatively coupled to an IP interface 1650 and Ethernet port 1648.

The ePDG 1600 may include additional or alternative components and functions or one or more of the functions and components may not be present or combined with other components or functions.

Figure 17:
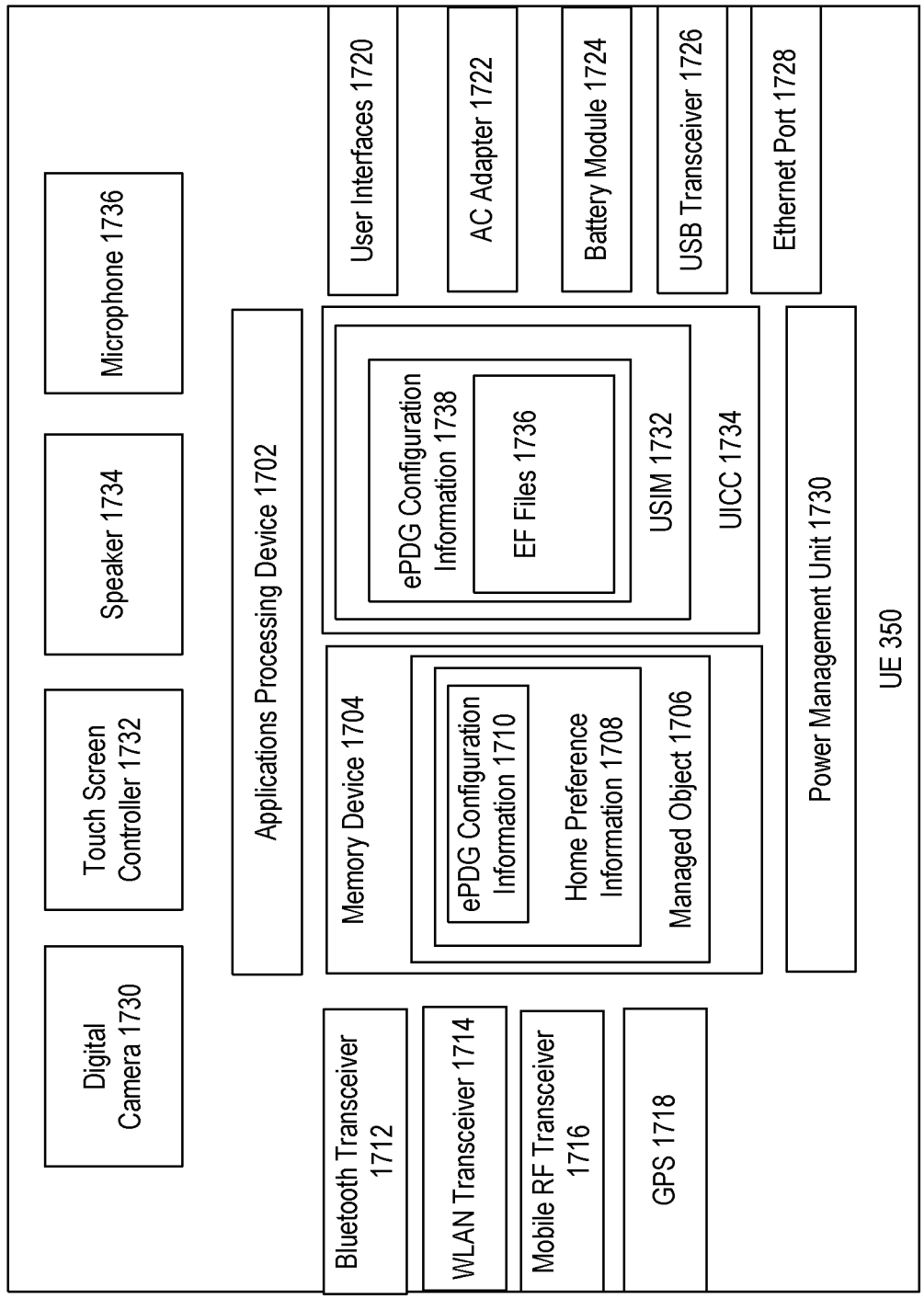
FIG. 17 illustrates a schematic block diagram of an embodiment of user equipment.

FIG. 17 illustrates a schematic block diagram of user equipment 350. User equipment (UE) 350 may include a smart phone, smart tablet, laptop, smart watch, PC, TV or other device. Thus, additional or alternative components and functions or one or more of the functions and components shown herein may not be present or combined with other components or functions.

The UE 350 may include an application processing device 1702 and memory device 1704 that are configured to perform one or more of the functions described herein with respect to the UE 350. The memory device 1704 may include a managed object 1706 that stores the home preference information 1708 including the ePDG configuration information 1710. The home preference information 1708 may be updated by the H-ANDSF and/or V-ANDSF. In addition, the UE 350 may also include a UICC 1734 that includes a USIM 1732. The USIM 1732 stores ePDG configuration information 1738 in separate EF Files 1736. For example, the EF Files 1736 may include: home ePDG identifier, emergency ePDG identifier, and/or ePDG selection information EF Files. In one aspect, the UICC 1734 stores default ePDG configuration information 1736 that is updated by the managed object 1706 when the ePDG configuration information 1710 is pushed to the UE 350 by the H-ANDSF or V-ANDSF.

The UE 350 may further include a Bluetooth transceiver 1712, a WLAN (IEEE 802.11x compliant) transceiver 1714, mobile RF (3G/4G) transceiver 1716 and GPS 1718. The WLAN transceiver 1714 may operate as a non-3GPP access interface to a WLAN network. The UE 350 may further include user interfaces 1720, AC adapter 1722, battery module 1724, USB transceiver 1726 and Ethernet Port 1728. The UE 350 may further include one or more user applications, such a digital camera 1730, touch screen controller 1732, speaker 1734 and microphone 1736. The UE 350 may also include a power management unit 1730. One or more internal communication buses (not shown) may communicatively couple one or more of the components of the UE 350.

Figure 18:
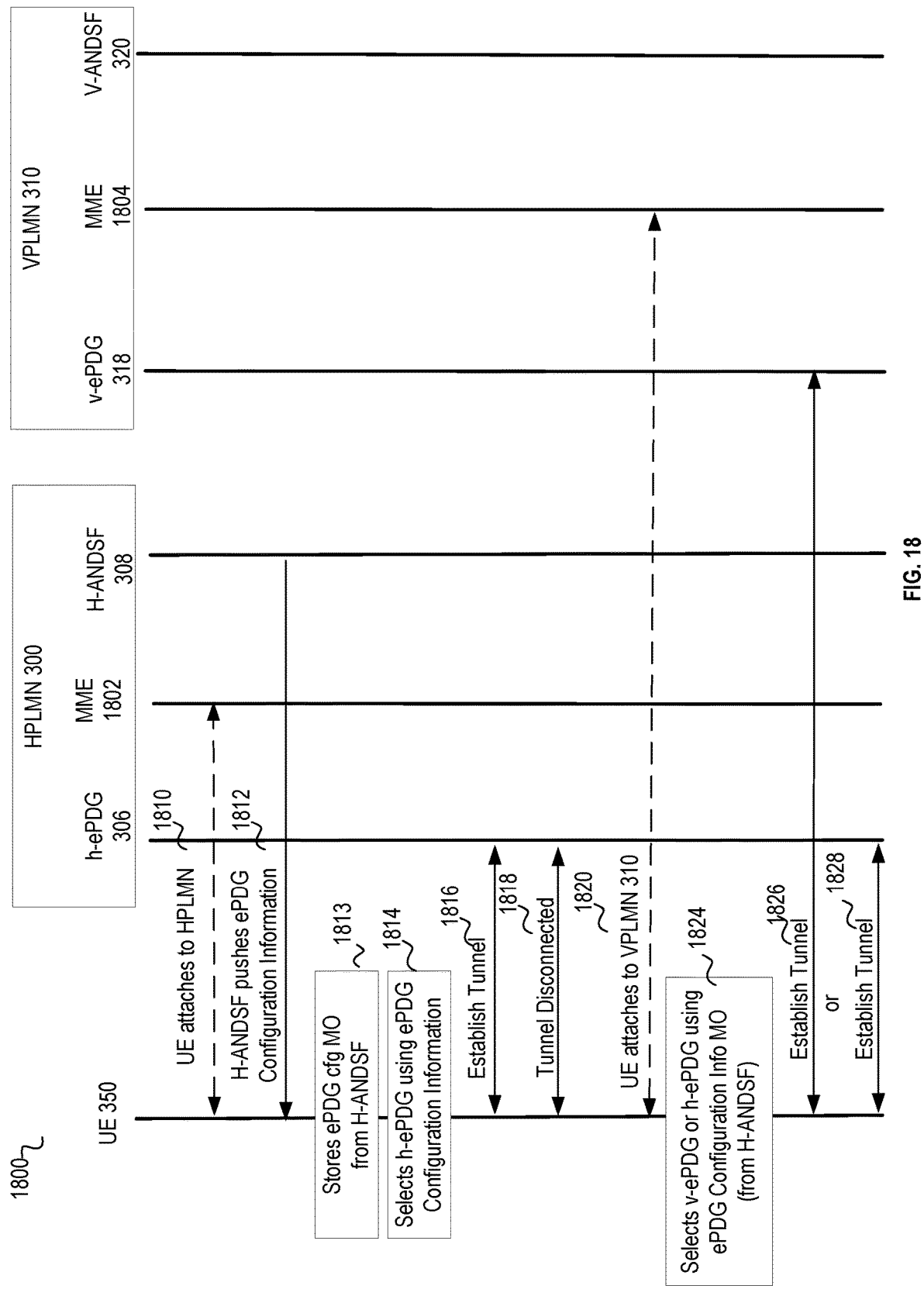
FIG. 18 illustrates a logical flow diagram of an embodiment of a method for configuration of UE and selection of an ePDG using ePDG configuration information from H-ANDSF.

FIG. 18 illustrates a logical flow diagram of an embodiment of a method 1800 for configuration of UE 350 and selection of an ePDG using ePDG configuration information. The UE 350 attaches to the HPLMN 300 using a mobile management entity (MME) 1802 as shown at 1810. The MME 1802 may be implemented within the serving gateway 314 or may be a separate entity or incorporated within another gateway or device. The MME 1802 performs the main signaling in the EPC network 100 and is responsible for initial paging and authentication of the user equipment 350. The H-ANDSF 308 of the HPLMN 300 pushes or transmits ePDG configuration information to the UE 350 as shown at 1812. The UE 350 stores the ePDG configuration information Management Object (ePDG cfg MO) received from the H-ANDSF 308 as shown at 1813. The UE 350 then selects an h-ePDG 306 using ePDG configuration information from the H-ANDSF 308 as shown at 1814. The UE 350 and h-ePDG 306 establish a tunnel connection, such as an IPSec tunnel, as shown at 1816. When the UE 350 roams into the VPLMN 310, the UE 350 and/or h-PDG 306 may disconnect the tunnel as shown at 1818. The UE 350 may then attach to the VPLMN 310 through the MME 1804 of the VPLMN 310 as shown at 1820. The UE 350 then selects the v-ePDG 318 (or h-ePDG 306 if VPLMN 310 is in the UE's home country) using the ePDG configuration information from the H-ANDSF as shown at 1824. The UE 350 and the v-ePDG 318 (or h-ePDG 306) then establish a tunnel connection, such as an IPSec tunnel, as shown at 1826 (or 1828), respectively.

Figure 19:
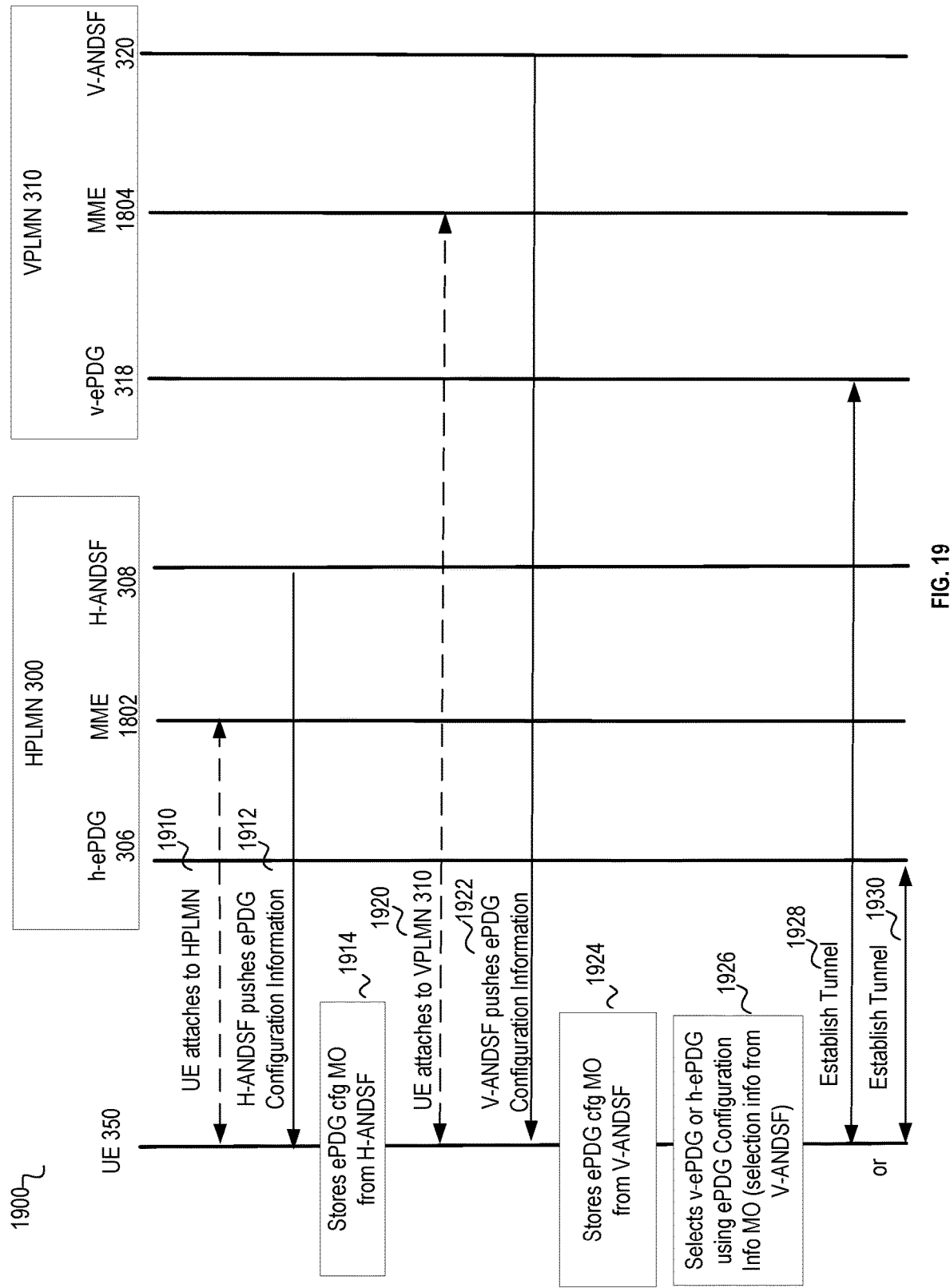
FIG. 19 illustrates a logical flow diagram of an embodiment of a method for configuration of UE and selection of an ePDG using ePDG configuration information from V-ANDSF.

FIG. 19 illustrates a logical flow diagram of an embodiment of a method 1900 for configuration of UE 350 and selection of an ePDG using ePDG configuration information. The UE 350 attaches to the HPLMN 300 using a mobile management entity (MME) 1802 as shown at 1910. The H-ANDSF 308 of the HPLMN 300 pushes or transmits ePDG configuration information to the UE 350 as shown at 1912. The UE 350 stores ePDG configuration info Management Object (ePDG cfg MO) received from the H-ANDSF 308 as shown at 1914. When the UE 350 attaches to the VPLMN 310 through the MME 1804 of the VPLMN 310 as shown at 1920, the V-ANDSF 320 may optionally push ePDG configuration information to the UE 350 as shown at 1922. The UE stores the ePDG configuration info Management Object received from the V-ANDSF 320 as shown at 1924. The UE 350 selects the v-ePDG 318 (or h-ePDG 306 if the VPLMN 310 is in the UE's home country) using the ePDG configuration information as shown at 1926. The UE 350 and the v-ePDG 318 (or h-ePDG 306) then establish a tunnel connection, such as an IPSec tunnel, as shown at 1928 (or 1930), respectively.

The UE 350 thus receives and stores configuration information for selection of an ePDG 1600. The ePDG configuration information includes one or more parameters relating to identification or functions of ePDGs 1600 in an HPLMN 300 and/or in one or more VPLMNs 310. When the UE 350 performs ePDG selection, the UE 350 accesses the ePDG configuration information and then selects an ePDG 1600 for access to a core packet network using the ePDG configuration information.

A processing device or applications processing device as described herein includes at least one processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory may be a single memory device or a plurality of memory devices. The memory device may be a read-only memory, random access memory, volatile memory, non-volatile memory, static memory, dynamic memory, flash memory, cache memory, and/or any non-transitory memory device that stores digital information. The term "module" is used in the description of one or more of the embodiments of elements herein. A module includes one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled". "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising." "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

What is claimed is:

1. A method of selecting an evolved packet data gateway (EPDG) by a user equipment (UE), comprising:
   accessing ePDG configuration information for one or more Public Land Mobile Networks (PLMNs) by requesting the provisioning of or automatically receiving the ePDG configuration information, wherein the ePDG configuration information includes identification of one or more ePDGs in the one or more PLMNs and a preference of a PLMN and corresponding identified ePDG;
   determining the preference of the PLMN and corresponding identified ePDG in the ePDG configuration information;
   selecting an ePDG using the ePDG configuration information and based on the preference; and
   connecting to the ePDG for access to a core network.

2. The method of claim 1, further comprising:
   attaching to a non-3GPP compliant access network in a visited PLMN (VPLMN); and
   selecting the ePDG in the VPLMN using the ePDG configuration information.

3. The method of claim 2, further comprising:
   receiving the ePDG configuration information from the VPLMN.

4. The method of claim 2, wherein the ePDG configuration information indicates the preference to select the ePDG in the VPLMN.

5. The method of claim 1, further comprising:
   attaching to a non-3GPP compliant access network in a visited PLMN (VPLMN); and
   selecting the ePDG in a home PLMN (HPLMN) using the ePDG configuration information.

6. The method of claim 5, further comprising:
   receiving the ePDG configuration information from the HPLMN.

7. The method of claim 5, wherein the ePDG configuration information indicates the preference to select the ePDG in the HPLMN of the UE.

8. A method of selecting an evolved packet data gateway (EPDG) by a user equipment (UE), comprising:
   receiving a request for an emergency services session;

accessing ePDG configuration information for one or more PLMNs by requesting the provisioning of or automatically receiving the ePDG configuration information, wherein the ePDG configuration information includes identification of one or more ePDGs that support emergency services and a preference of a PLMN and corresponding identified ePDG;

determining the preference of the PLMN and corresponding identified ePDG in the ePDG configuration information;

selecting an ePDG using the ePDG configuration information and based on the preference; and connecting to the selected ePDG to establish the emergency services session.

9. The method of claim 8, further comprising:
attaching to a non-3GPP compliant access network; and
selecting the ePDG in an HPLMN of the UE using the ePDG configuration information.

10. The method of claim 9, wherein the ePDG configuration information includes ePDG emergency services configuration information that includes a list of one or more ePDGs in the HPLMN of the UE that support emergency services.

11. The method of claim 9, wherein the ePDG configuration information includes:
a home ePDG identifier that includes a list of one or more ePDGs in the HPLMN; and
an emergency service support parameter associated with each ePDG in the list of one or more ePDGs that indicates whether the associated ePDG provides support for emergency services.

12. User equipment (UE) comprising:
a wireless local area network (WLAN) transceiver for connecting to a non-trusted 3GPP access network;
a memory device for storing ePDG configuration information requested or automatically received from an Access Network Discovery and Selection Function (ANDSF) managed object, wherein the ePDG configuration information includes identification of one or more ePDGs in one or more Public Land Mobile Networks (PLMNs) and a preference of a PLMN and corresponding identified ePDG;
and
a processing device configured to:
determine the preference of the PLMN and corresponding identified ePDG in the ePDG configuration information;
select an ePDG using the ePDG configuration information and based on the preference; and
establish a connection to the selected ePDG.

13. The user equipment of claim 12, wherein the processing device is further configured to:
determine a country of location of the UE; and
select the ePDG using the ePDG configuration information and the determined country of location of the UE.

14. The user equipment of claim 12, wherein the processing device is further configured to:
determine the UE is located in its country of origin; and
select the ePDG in an HPLMN of the UE using the ePDG configuration information.

15. The user equipment of claim 12, wherein the processing device is further configured to:
determine the UE is located outside its country of origin;
determine that selection of one or more VPLMNs is required; and
select the ePDG in the one or more VPLMNs configured in the ePDG configuration information.

16. The user equipment of claim 12, wherein the processing device is further configured to:
determine the UE is located in a visiting country;
determine that selection of one or more VPLMNs in the visiting country is required; and
select the ePDG from the one or more VPLMNs located in a visiting country, wherein identifications of the one or more VPLMNs are included in responses to a DNS query.

17. The user equipment of claim 12, wherein the processing device is further configured to:
determine the UE is located outside its country of origin;
determine that selection of one or more VPLMNs is not required; and
select the ePDG in an HPLMN of the UE using the ePDG configuration information.

18. The user equipment of claim 12, wherein the processing device is further configured to:
establish an attachment to a non-3GPP compliant access network in a visited PLMN (VPLMN); and
select the ePDG in the VPLMN using the ePDG configuration information.

19. The user equipment of claim 12, wherein the processing device is further configured to:
attach to a non-3GPP compliant access network in a visited PLMN (VPLMN); and
select the ePDG in a home PLMN (HPLMN) using the ePDG configuration information.

20. The user equipment of claim 19, wherein the ePDG configuration information indicates the preference to select the ePDG in the HPLMN of the UE.

* * * * *